(12) United States Patent
Saha

(10) Patent No.: US 10,720,075 B2
(45) Date of Patent: Jul. 21, 2020

(54) CELLOPHANE CUT OUT KITS FOR OPTICAL ART

(76) Inventor: Pamela Saha, Brooklyn, NY (US)

(*) Notice: Subject to any disclaimer, the term of this patent is extended or adjusted under 35 U.S.C. 154(b) by 1704 days.

(21) Appl. No.: 13/200,500

(22) Filed: Sep. 23, 2011

(65) Prior Publication Data

US 2012/0077152 A1 Mar. 29, 2012

Related U.S. Application Data

(60) Provisional application No. 61/385,930, filed on Sep. 23, 2010.

(51) Int. Cl.
*G09B 11/00* (2006.01)
*G09B 11/06* (2006.01)

(52) U.S. Cl.
CPC ............. *G09B 11/00* (2013.01); *G09B 11/06* (2013.01)

(58) Field of Classification Search
CPC .............................. G01B 11/00; G01B 11/002
USPC ........................................................... 434/81
See application file for complete search history.

(56) References Cited

U.S. PATENT DOCUMENTS

| | | | | |
|---|---|---|---|---|
| 1,907,937 A * | 5/1933 | Levkoff | ............... | B65D 5/4204 206/45.26 |
| 2,011,714 A * | 8/1935 | Friedman | ........................ | 446/87 |
| 3,033,357 A * | 5/1962 | Vogel | ........................ | A41H 3/08 206/574 |
| 3,773,314 A * | 11/1973 | Giovannini | ............ | B65H 35/00 493/18 |
| 3,815,263 A * | 6/1974 | Oberwager | ............. | B44F 1/063 428/38 |
| 4,225,641 A * | 9/1980 | Yokomizo | ............... | B44C 1/105 156/233 |
| 4,431,262 A * | 2/1984 | Tolles | .................. | G01N 21/255 385/147 |
| 4,925,429 A * | 5/1990 | Kaulfuss | ................ | A63H 33/16 446/487 |
| 5,435,518 A * | 7/1995 | Iguchi | ..................... | G09B 25/00 206/223 |
| 6,618,556 B1 * | 9/2003 | Kosinski | ......................... | 396/43 |
| 7,054,708 B1 * | 5/2006 | Aamodt | ................. | B26D 5/005 700/122 |
| 7,477,386 B2 * | 1/2009 | Saha | ...................... | G01B 11/18 356/364 |

(Continued)

*Primary Examiner* — John E Simms, Jr.
*Assistant Examiner* — Dolores Collins
(74) *Attorney, Agent, or Firm* — Fresh IP PLC; Aubrey Y Chen

(57) ABSTRACT

One or more transparent or translucent sheets of cellophane are folded and cuts are made to create symmetric patterns and designs. The cellophane creates diffraction, refraction, interference, and reflection pattern of light that become strikingly visible when viewed under polarized light. The cellophane patterns and designs are placed on top of one another such that the holes in the overlapping sheets cause a variation in the path of light traveling through the layers of the cellophane, creating beautiful and varied optical patterns of light that change with the placement of the layers of cellophane and with variation of the angle of polarized light for a kaleidoscope effect. The cellophane is viewed against the backdrop of a blue sky to provide a source of polarized light. Placing the cellophane on glossy black cardboard brings out the prismatic colors created by light refraction and reflection.

22 Claims, 27 Drawing Sheets
(9 of 27 Drawing Sheet(s) Filed in Color)

(56) References Cited

U.S. PATENT DOCUMENTS

| | | | | |
|---|---|---|---|---|
| 7,834,987 B2* | 11/2010 | Reinitz | G01N 21/87 356/31 |
| 7,936,458 B2* | 5/2011 | Saha | G01B 11/18 356/364 |
| 8,072,681 B2* | 12/2011 | Coleman | G02B 27/26 359/459 |
| 8,107,076 B1* | 1/2012 | Saha | G01B 11/18 356/364 |
| 8,233,099 B1* | 7/2012 | Comarow | A63H 33/22 349/10 |
| 8,582,063 B2* | 11/2013 | Comarow | A63H 33/22 349/122 |
| 8,675,177 B2* | 3/2014 | Kudo | G03B 27/42 355/71 |
| 8,711,477 B2* | 4/2014 | Coleman | G02B 27/26 359/459 |
| 2001/0010571 A1* | 8/2001 | Kanou et al. | 349/113 |
| 2006/0087642 A1* | 4/2006 | Saha | 356/33 |
| 2006/0219762 A1* | 10/2006 | Pierce | B65D 27/04 229/71 |
| 2009/0091046 A1* | 4/2009 | Saha | 264/1.7 |
| 2011/0255303 A1* | 10/2011 | Nichol | G02B 6/006 362/606 |
| 2011/0268966 A1* | 11/2011 | Yun et al. | 428/339 |
| 2012/0095208 A1* | 4/2012 | Park | B01D 11/0257 536/128 |
| 2012/0167746 A1* | 7/2012 | Jacobsen | 84/477 R |
| 2012/0206803 A1* | 8/2012 | Saha | A63H 33/22 359/485.01 |
| 2012/0206806 A1* | 8/2012 | Weber | G02F 1/13362 359/489.11 |
| 2012/0289119 A1* | 11/2012 | Comarow et al. | 446/219 |
| 2013/0115339 A1* | 5/2013 | Saha | A23L 1/0073 426/104 |

* cited by examiner

CELLOPHANE CUT OUT KITS FOR OPTICAL ART

This application claims the benefit of U.S. provisional patent application No. 61/385,930, filed Sep. 23, 2010, which is hereby incorporated by reference in its entirety. This invention also builds off the inventor's prior U.S. patent application Ser. No. 12/931,810, filed Feb. 11, 2011, which is also incorporated by reference herein in its entirety.

BACKGROUND

The present invention relates generally to optical art.

The art of folding paper and cutting out pieces of the folded paper to create a symmetrical display of designs is a very old craft technique. Children learn how to cut out a string of paper dolls using this method. The technique has been applied to cut out intricate patterns like snowflakes using a few well placed holes in folded paper. The choice of patterns is infinite and even random placement of holes in folded paper will create a design. Creations can vary according to number of folds, size of paper, color of paper, placement of fold lines, and the type, placement, and shape of holes cut out. Up until now this art has been limited to paper craft, without application in other areas of interest.

Needs exist for expanded opportunities to experience science through art, making both science and art more attractive to children and adults.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In this invention the familiar strategy of paper cut outs is applied in a new and innovative way using cellophane. Instead of paper, one or more transparent or translucent sheets of cellophane are folded and cuts are made to create symmetric patterns and designs. There, sheets of cellophane have a property that paper does not have. The cellophane creates a diffraction pattern of light that becomes strikingly visible when viewed under polarized light.

When sheets of the cellophane are placed on top of one another such that the holes in the overlapping sheets cause a variation in the path of light traveling through the layers of the cellophane, beautiful and varied optical patterns of light are created. These patterns change with the placement of the layers of cellophane and when the transmission of polarized light is varied. This can be achieved by movement of the light source, rotation of a polarizing film, changing an observer's position, or even rotating the cellophane cut outs themselves creating a kaleidoscope effect. The cellophane also exhibits photoelasticity, particularly if stretched or otherwise stressed.

The optical patterns manifested in the cellophane and other materials use the properties of light exhibited in reflection, refraction, interference and diffraction. Optical effects are also enhanced with glow in the dark material or drawings/art, which are used in some embodiments to add to the optical effects observed. Glow-in-the-dark material can create an observable optical effect even when there is a light source glowing behind the glow-in-the-dark material.

In addition to cellophane, any translucent paper-thin material, such as wax paper, can be used and layered with optical material. A layer of liquid optical material such as rubber cement can be applied to the surface of the thin material or between layers of the thin material.

The cuts outs removed from the cellophane in some embodiments are bent/creased in a certain way to fold them into a 3D configuration (that does not merely lie flat) and stacked to create an iridescent and varied prismatic display pattern as light flows through the structures of stacked and bent patterns. Light patterns change with the point of view of the viewer and the direction of the light source through the cellophane structures.

Kits that provide the customer with cut-to-size sheets with folding and cutting directions, along with a toy polariscope for viewing creations, provide the user with a new way to experience both art and science. These kits in some embodiments also come with precut patterns that the customer can use, with directions on how to overlap or stack them as well. Parts or all of the polariscope in some embodiments glow in the dark. Glow-in-the-dark polarizing glasses and polariscopes allow users to see rainbow colors magically appear when using them with a light source when the room is dark.

Black Glossy cardboard, the blue sky, other reflective surfaces including water or other liquid surfaces in some embodiments also serve as a polarizing source to view these patterns.

In a new optical art method, one or more sheets of cellophane are folded, one or more shapes are cut out along a fold of the one or more folded sheets of cellophane, the cellophane is unfolded to reveal one or more symmetrical designs, and the designs are viewed under polarized light. In an embodiment, two or more of the designs are overlapped when viewing the designs under polarized light to create diffraction patterns. In an embodiment, one or more of the sheets of cellophane are folded into a three-dimensional design. The three-dimensional design may be stacked with another design. This other design may also be three-dimensional.

In an embodiment, a source of the polarized light is moved or rotated to produce shifting colors. In an embodiment, the designs are moved or rotated while being viewed under polarized light to produce shifting colors. In an embodiment, the designs are viewed with a polariscope. In an embodiment, the designs are viewed through a polarizing lens. The polarizing lens may be rotated during viewing to produce shifting colors. In an embodiment, the designs are placed on glossy black cardboard. In an embodiment, the designs are viewed under polarizing light by holding them up to a blue sky. In an embodiment, a kite including the designs is constructed.

In one embodiment, two or more sheets of cellophane are folded identically, similar shapes are cut out of each sheet of cellophane in different sizes, and the cellophane sheets are aligned and layered in order from the cellophane sheet with the smallest cut-out shapes to the sheet with the largest cut-out shapes, such that the cut-out shapes of each cellophane sheet surround the cut-out shapes of the cellophane sheet beneath it. In an embodiment, the cellophane is sandwiched between polarizing films and the polarizing films are secured together at their edges with one or more rings of cardboard. In an embodiment, one or more of the cut-out shapes are fixed to the unfolded cellophane. In an embodiment, glow-in-the-dark material is added to the unfolded cellophane.

In a new optical art method, one or more sheets of translucent paper-thin material are folded, the one or more sheets of translucent paper-thin material are layered with liquid optical material, one or more shapes are cut out along a fold of the one or more folded sheets of translucent paper-thin material, the translucent paper-thin material is unfolded to reveal one or more symmetrical designs, and the designs are viewed under polarized light.

A new optical art kit includes sheets of cellophane, one or more polarizing lenses, and guides for folding and cutting the sheets of cellophane to create designs and for overlapping the designs and viewing them under polarizing light to view light reflection, refraction, diffraction, or interference patterns. The guide may include a finished cut-out pattern, template, cut-out patterns in various stages of completion, and/or images of construction steps and/or designs in various stages of completion, rendered on physical or electronic media. The kit may include glossy black cardboard for placing cellophane on for viewing, a polariscope, where the one or more polarizing lenses are a part of the polariscope. a motorized rotational device with attachment structure for attaching to and rotating the polarizing lenses, and/or a polariscope or pair of polarizing glasses, comprising glow-in-the-dark material.

These and other objectives and features of the invention are apparent in the disclosure, which includes the above and ongoing written specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIG. 8 is a close up of FIG. 7 showing the two rings of polarizing films with the sheets of cut patterns of cellophane in between.

DETAILED DESCRIPTION

Figure 1:
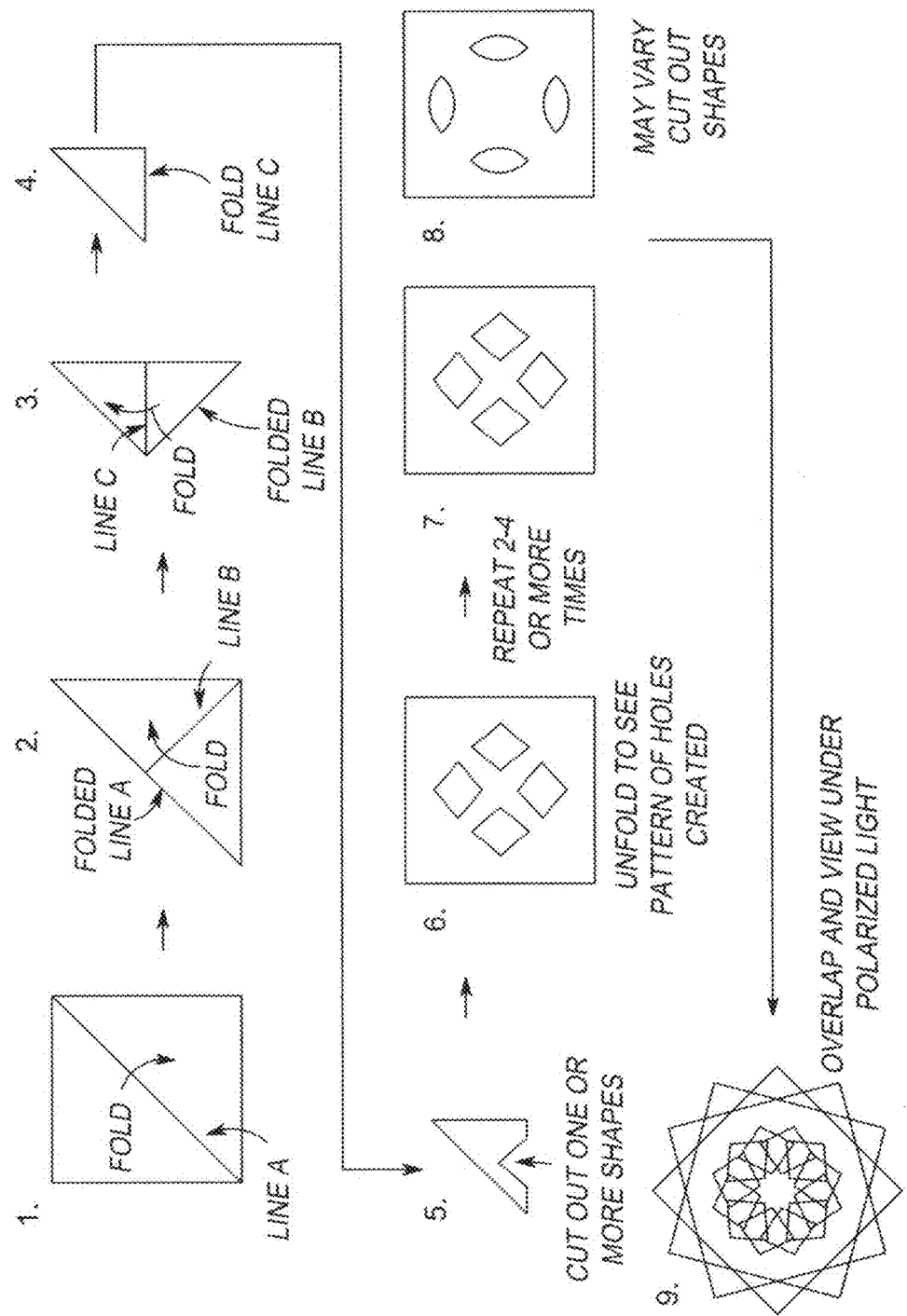
FIG. 1 is a diagram illustrating an exemplary method of creating patterns by folding and cutting out holes, starting with a precision-cut sheet of cellophane.

Cellophane cut out kits for optical art will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

FIG. 1 is a diagram illustrating an exemplary method of creating patterns by folding and cutting out holes, starting with a precision-cut sheet of cellophane.

One sheet of a square piece of transparent or translucent cellophane is folded 1 in half along its diagonal. The sheet is folded again 2 along a line connecting the apex of the triangle with the midpoint of the hypotenuse of the triangle. This fold is repeated 3, resulting in a folded sheet 4 shown prior to making cuts. A cut in the shape of a triangle is made 5 along the main fold (this cut is half the actual hole produced which in this case is a diamond-like shape), producing a pattern 6 when the sheet is unfolded. More patterned sheets are created 7 using this technique. Different shaped holes are created 8 in sheets by this method. The sheets are overlapped 9 and viewed under polarized light for effect.

Figure 2:
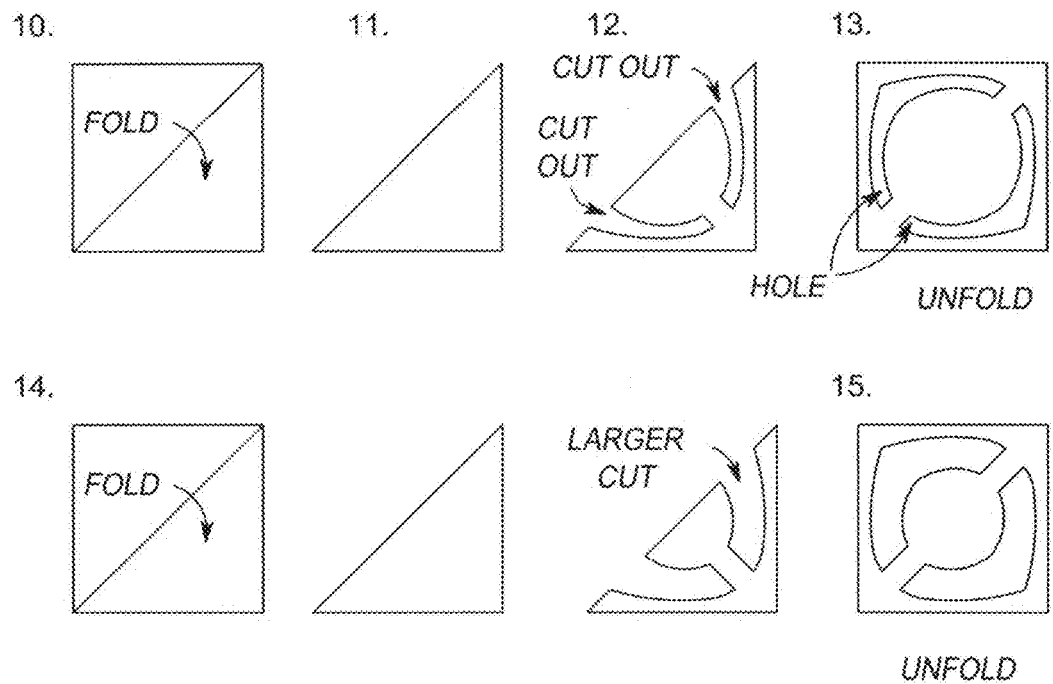
FIG. 2 is a diagram illustrating an exemplary method of creating patterns by folding and cutting out holes, starting with a precision-cut sheet of cellophane.

FIG. 2 is a diagram illustrating an exemplary method of creating patterns by folding and cutting out holes, starting with a precision-cut sheet of cellophane. A sheet as before is folded in half 10 along the diagonal to result in the folded sheet before cutting 11. A portion is cut out 12 along the fold, resulting in a pattern of the cut out 13 produced when the sheet is unfolded. The method is repeated 15 one or more times with new sheets of cellophane, making the size of the hole smaller or larger as in this case, resulting in the unfolded sheet 14. The result is the same pattern that partially overlaps due to differences in size, which causes a diffraction pattern of light when the sheets overlap one another.

Figure 3:
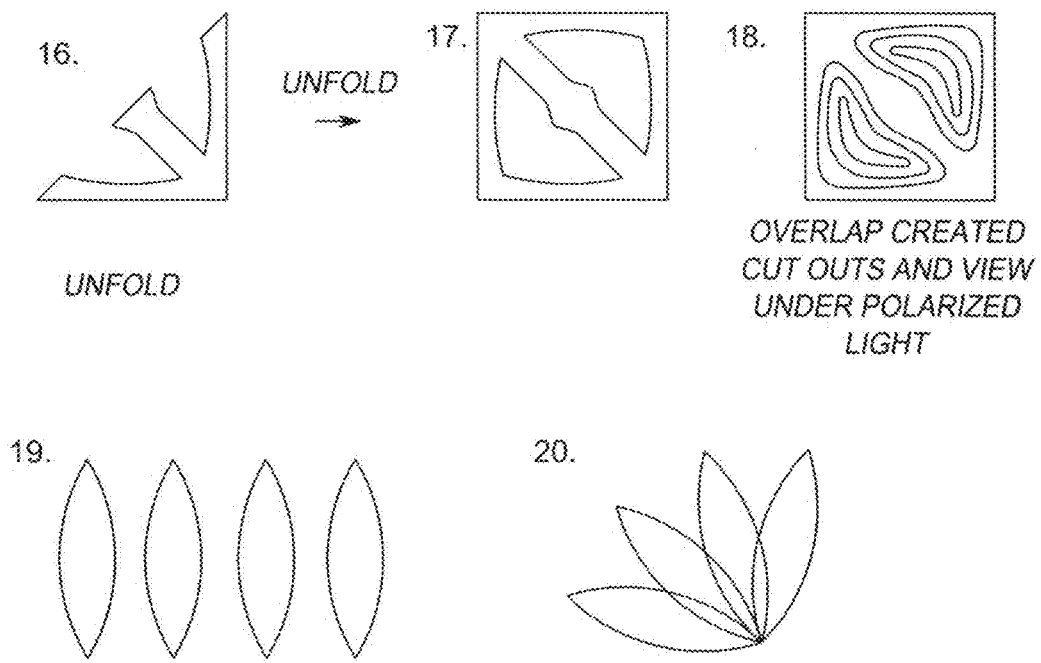
FIG. 3 is a diagram illustrating further steps in the method of FIG. 2.

FIG. 3 is a diagram illustrating further steps in the method of FIG. 2. A sheet with a still larger cut 16 is used to add to the area of overlap of uncut material, resulting in the unfolded sheet with larger cut 7. Sheets are placed on top of one another 18, the holes of each layer gradually exposing more of the underlying sheets. The order of placement of the sheets and even the orientation can vary. The partial overlapping of cellophane produces the optical effect through a diffraction pattern. A generic example uses individual petal shapes 19 and shows the petal shapes overlapped 20 in such a way that a portion of the petals cover one another partially, creating an optical effect.

Figure 4:
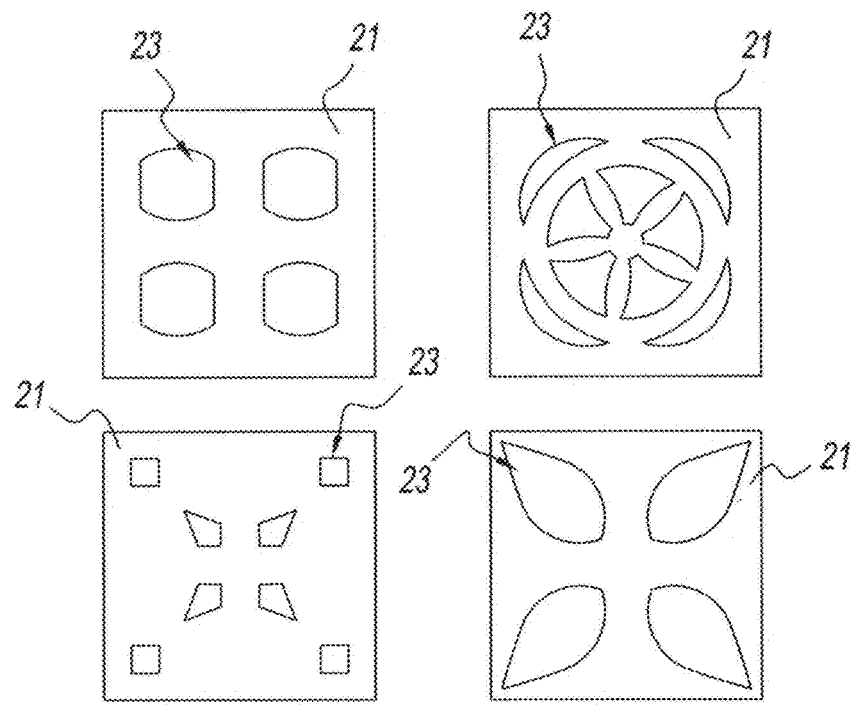
FIG. 4 is a picture of four sheets of cellophane with a cut out pattern produced by folding the sheets of cellophane and cutting out a variety of hole shapes and patterns.

FIG. 4 is a picture of four sheets of cellophane 21 with cut out patterns 23 produced by folding the sheets of cellophane and cutting out a variety of hole shapes and patterns.

Figure 5:
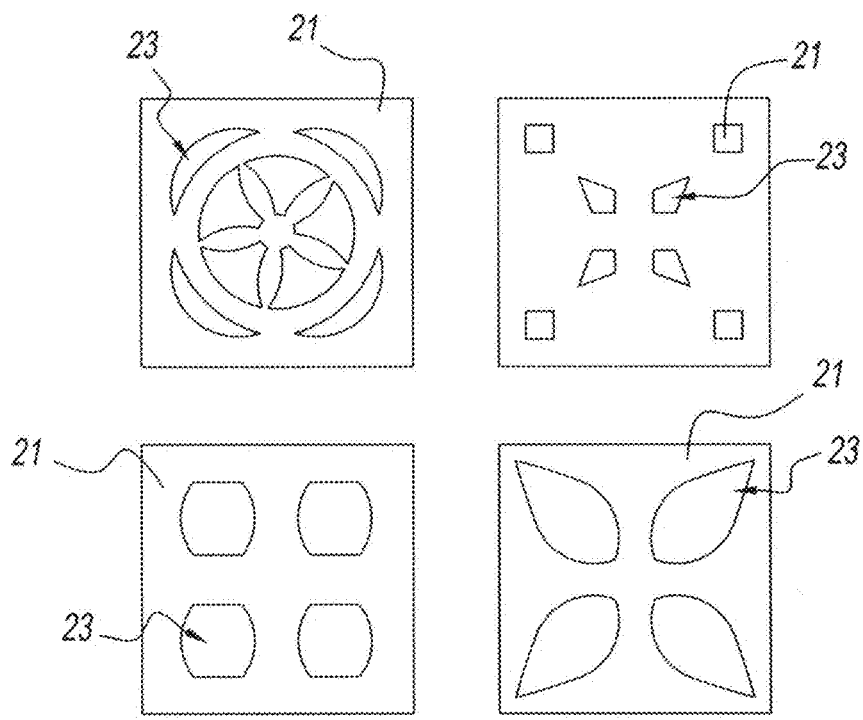
FIG. 5 is a picture of the four sheets of cellophane shown in FIG. 4 viewed under polarized light.

FIG. 5 is a picture of the four sheets of cellophane 21 shown in FIG. 4 viewed under polarized light.

Figure 6:
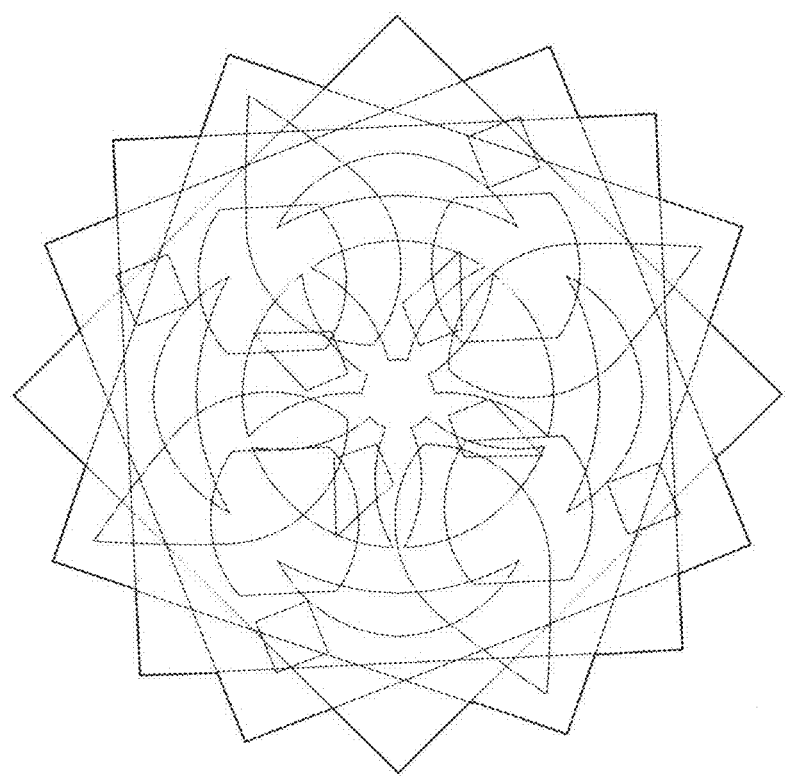
FIG. 6 is a picture of the four sheets of cellophane placed on top of one another and viewed under polarized light.

FIG. 6 is a picture of the four sheets of cellophane shown in FIGS. 4 and 5 placed on top of one another and viewed under polarized light.

Figure 7:
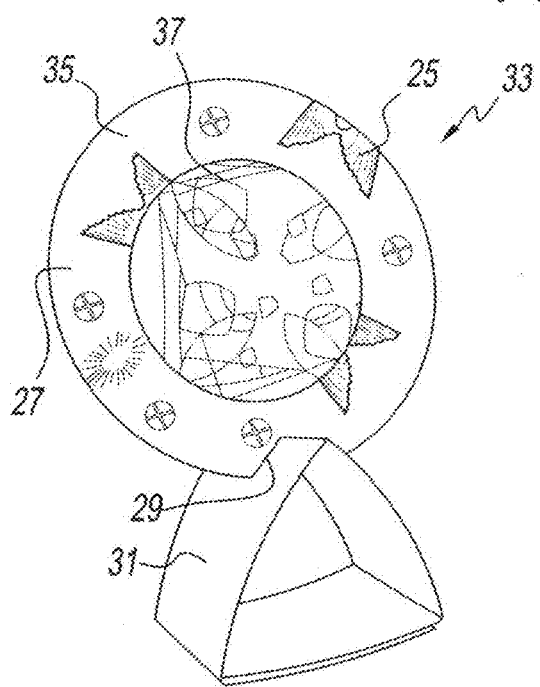
FIG. 7 is a picture of the four sheets on top of one another placed between two rings of polarizing films, held together with a paper clip and inserted in the slit in the base of a toy polariscope.

FIG. 7 is a picture of the four sheets on top of one another as shown in FIG. 6 and placed between two rings 25 of polarizing films, held together with a paper clip 27 and inserted in the slit 29 in the base 31 of a toy polariscope 33. The rings 25 are for example two-layer rings of cardboard 35 with a polarizing film 37 inserted between the layers of each ring and secured by adhesive or a clip 27 or other fastener.

Figure 8:
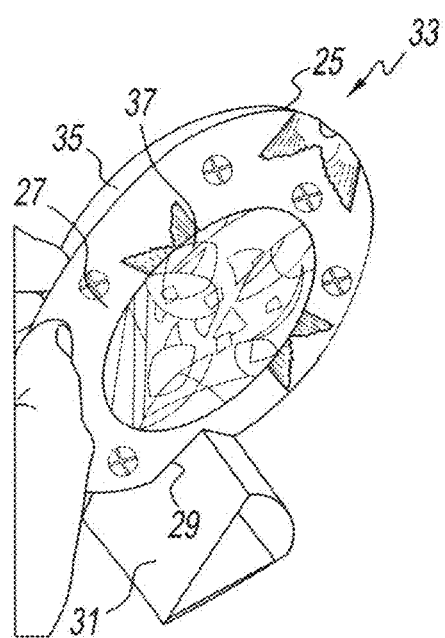

FIG. 8 is a close up of FIG. 7 showing the two rings 25 of polarizing films with the sheets of cut patterns of cellophane in between.

Figure 9:
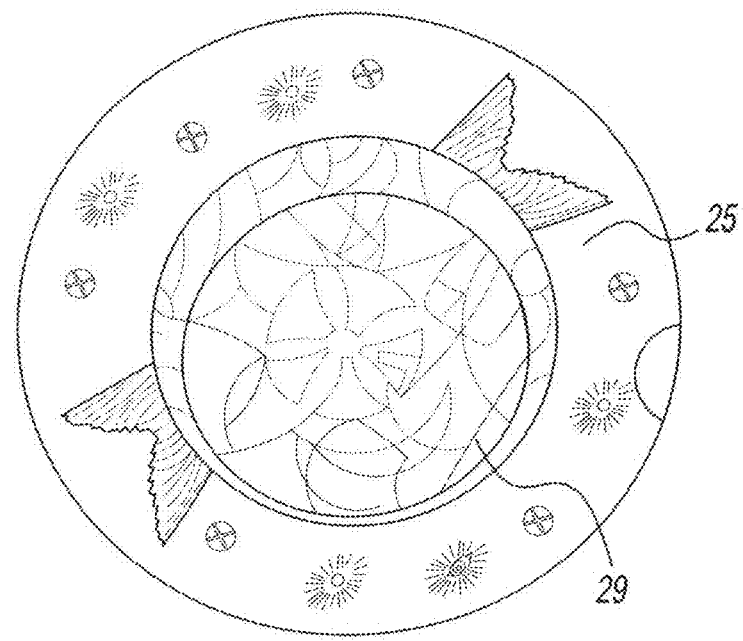
FIG. 9 shows the sheets of cut out cellophane between the two rings of polarizing films placed over a light.

FIG. 9 shows the sheets of cut out cellophane between the two rings 25 of polarizing films placed over a light 39.

Figure 10:
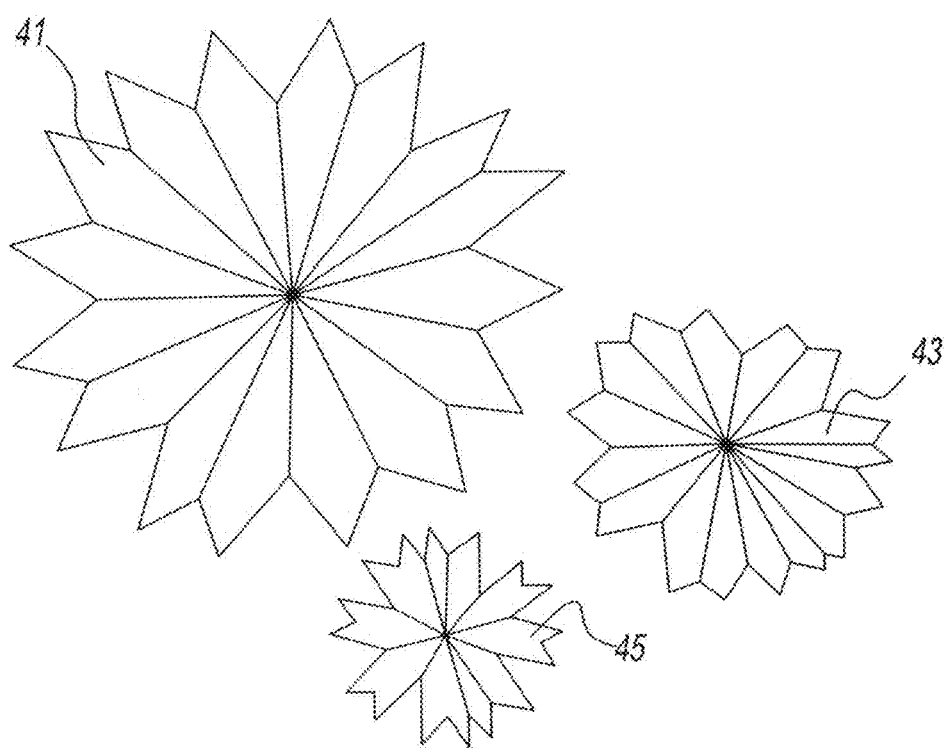
FIG. 10 is a picture of three sizes of a cellophane pattern cut out from three separate cellophane sheets.

FIG. 10 is a picture of three sizes of a cellophane pattern 41, 43, 45 cut out from three separate cellophane sheets.

Figure 11:
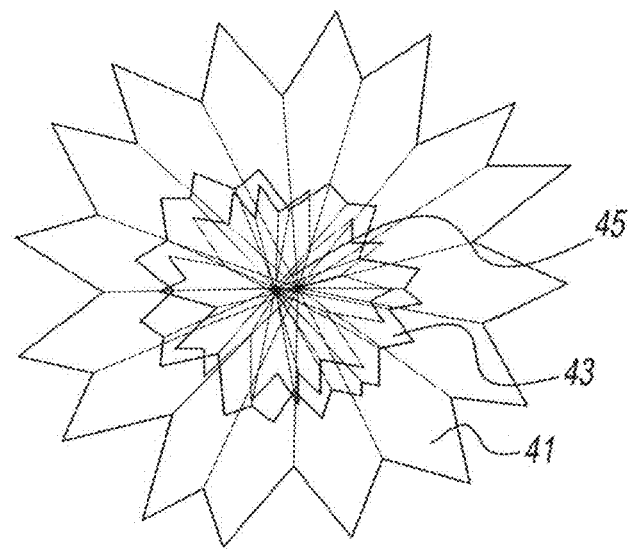
FIG. 11 is a picture of the 3 sizes of a cellophane pattern placed on top of one another.

FIG. 11 is a picture of the 3 sizes of a cellophane pattern 41, 43, 45 placed on top of one another.

Figure 12:
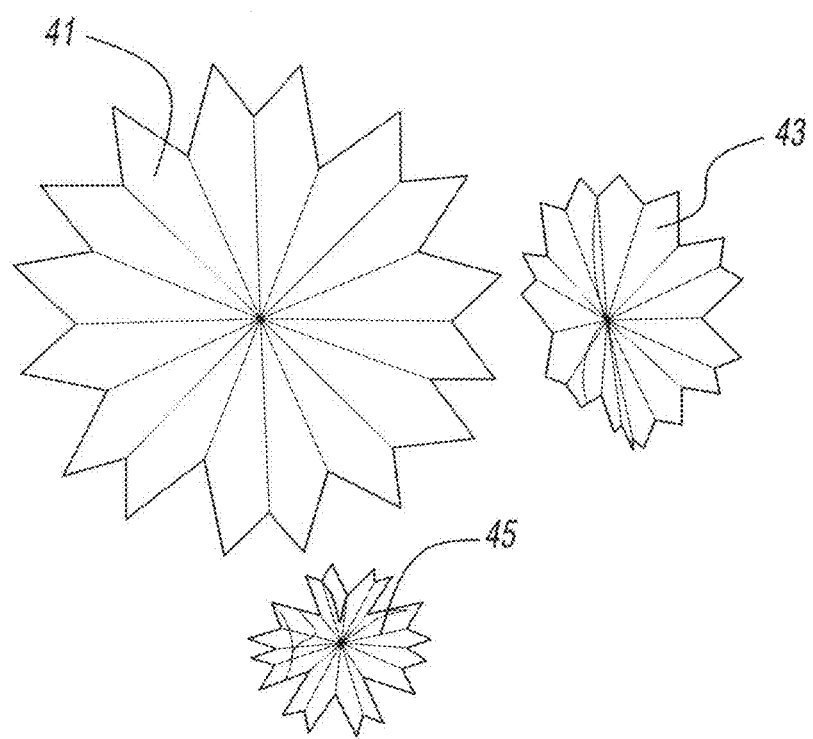
FIG. 12 is a picture of the 3 sizes of a cellophane pattern viewed under polarized light.

FIG. 12 is a picture of the 3 sizes of a cellophane pattern 41, 43, 45 viewed under polarized light.

Figure 13:
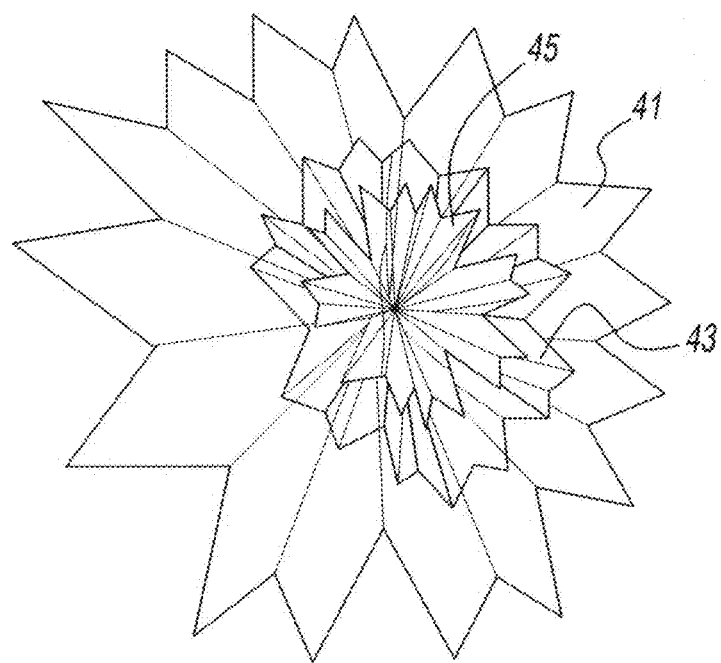
FIGS. 13-14 show the 3 sizes of a cellophane pattern shown in FIG. 12 placed on top of one another and viewed under polarized light.
Figure 14:
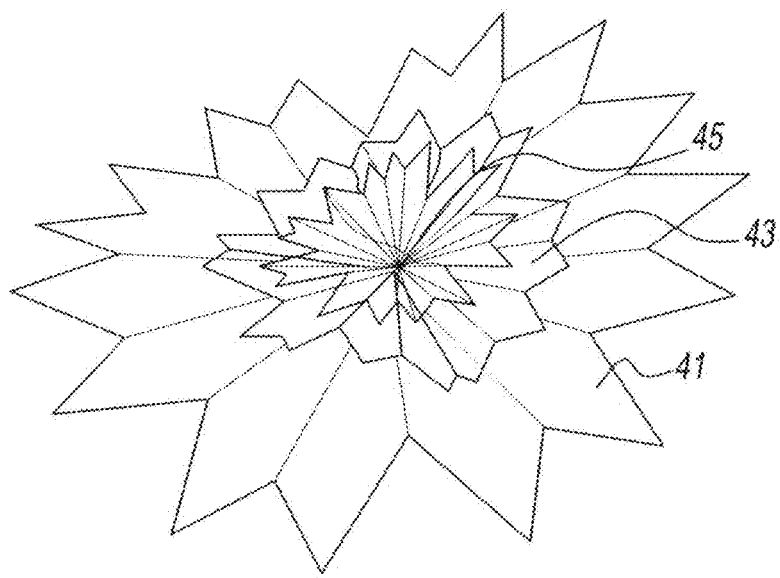

FIGS. 13-14 show the 3 sizes of a cellophane pattern 41, 43, 45 shown in FIG. 12 placed on top of one another and viewed under polarized light from various angles.

Figure 15:
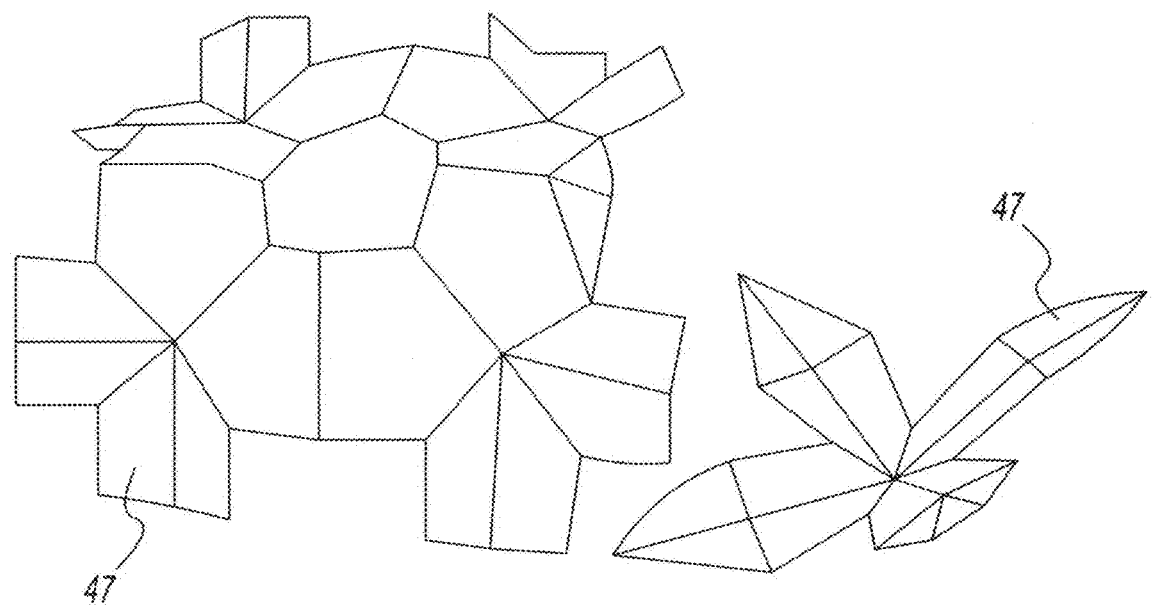
FIG. 15 shows additional possible cut-out patterns. A variety of cut out patterns are possible and can even be 3D rather than flat.

FIG. 15 shows additional possible cut-out patterns 47. A variety of cut out patterns are possible and can even be 3D rather than flat. The patterns shown have been folded so that they extend substantially out of the xy plane of the original cellophane sheet and into the perpendicular z-plane, giving the patterns depth and making them three-dimensional. Although a flat sheet of cellophane might technically be called three-dimensional like any physical object, it would not be considered a three-dimensional design according to the present invention, nor would an otherwise flat sheet having a residual fold line or surface markings.

Figure 16:
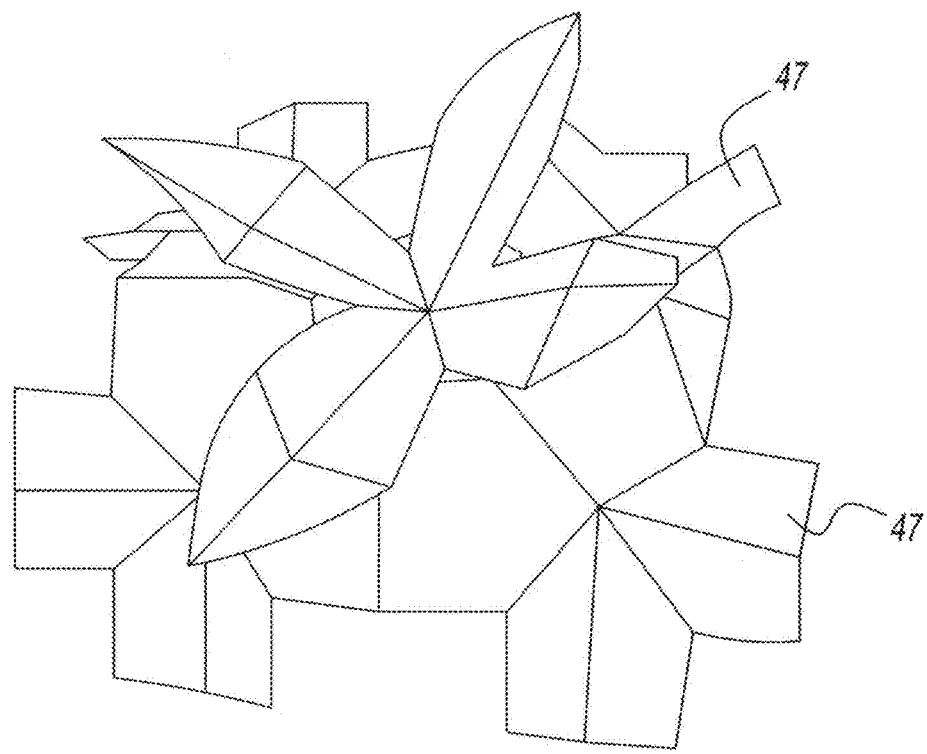
FIG. 16 shows the cut-out patterns of FIG. 15 stacked for a 3D effect.

FIG. 16 shows the cut-out patterns 47 of FIG. 15 stacked for a 3D effect.

Figure 17:
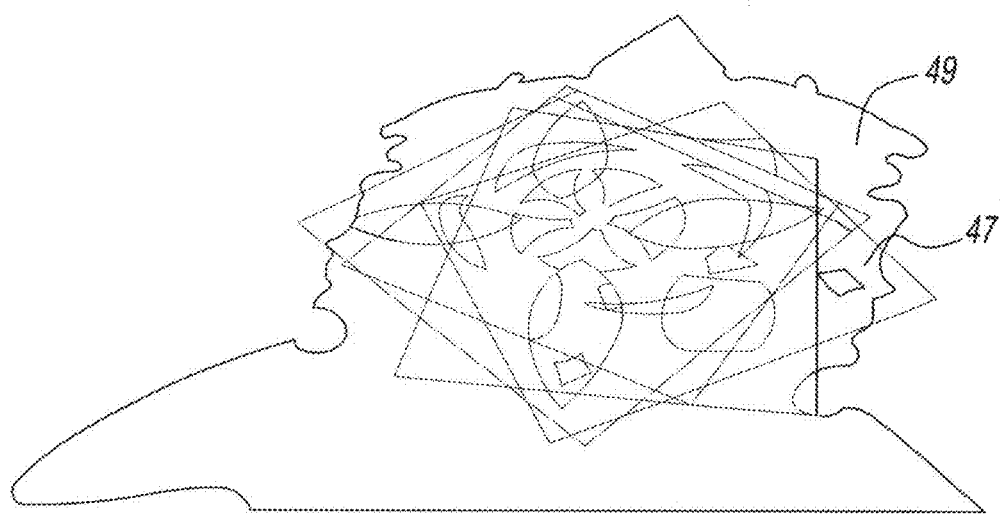
FIG. 17 shows layered cut-out cellophane viewed on glossy black cardboard.

FIG. 17 shows layered cut-out cellophane 49 viewed on glossy black cardboard 51. Optical patterns created by the cellophane are due to light reflection and refraction as well as diffraction and interference. In addition to the use of the properties of reflection, refraction, diffraction and interference for cellophane under polarized light, a black glossy cardboard or other reflective surface can be used under the cellophane and/or tape. The resulting optical effect can be seen with one polarizing film for the viewer, the cellophane and the black glossy cardboard. The effect is also visible when using cellophane, 53 one polarizing film 55 for viewing and the sky 57 as a backdrop as in FIGS. 25-26. At times, the color pattern can be seen even without a polarizing film, just using one or more thin layers of cellophane on black glossy cardboard. The pattern may even be observed without placing a black glossy cardboard or other reflective surface. This happens at an angle of observation when light undergoes total internal reflection within the material.

Figure 25:
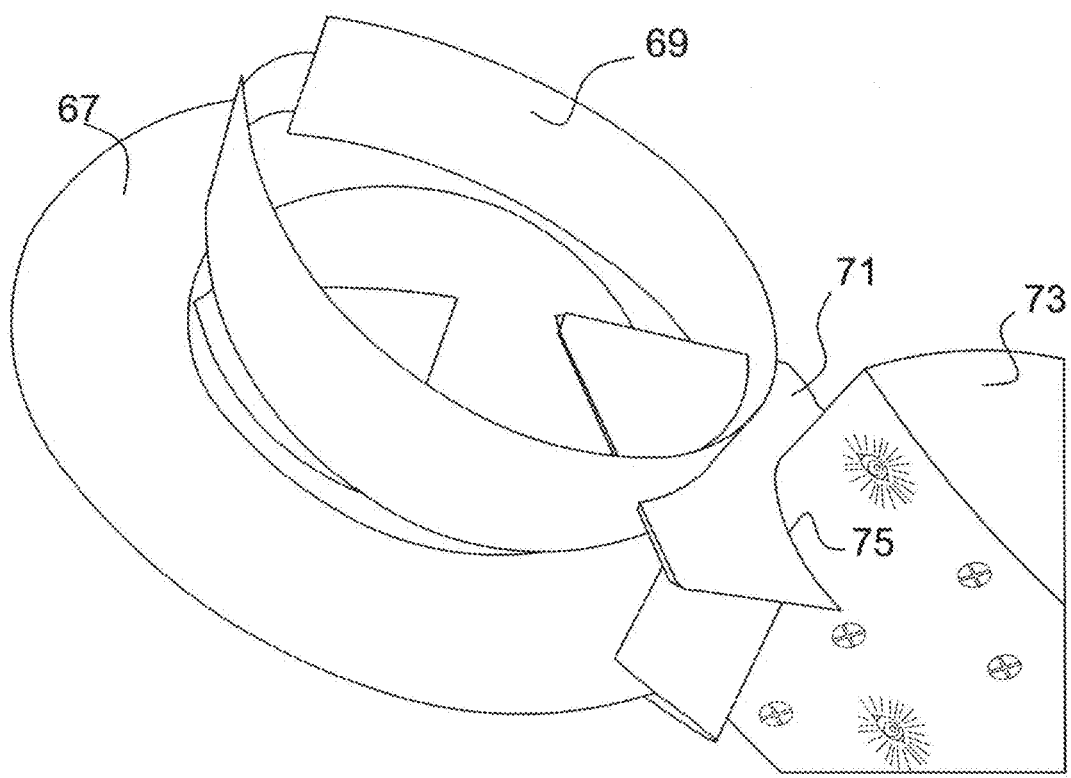
FIGS. 25-29 show the steps of inserting cellophane art into a polariscope for viewing.
Figure 26:
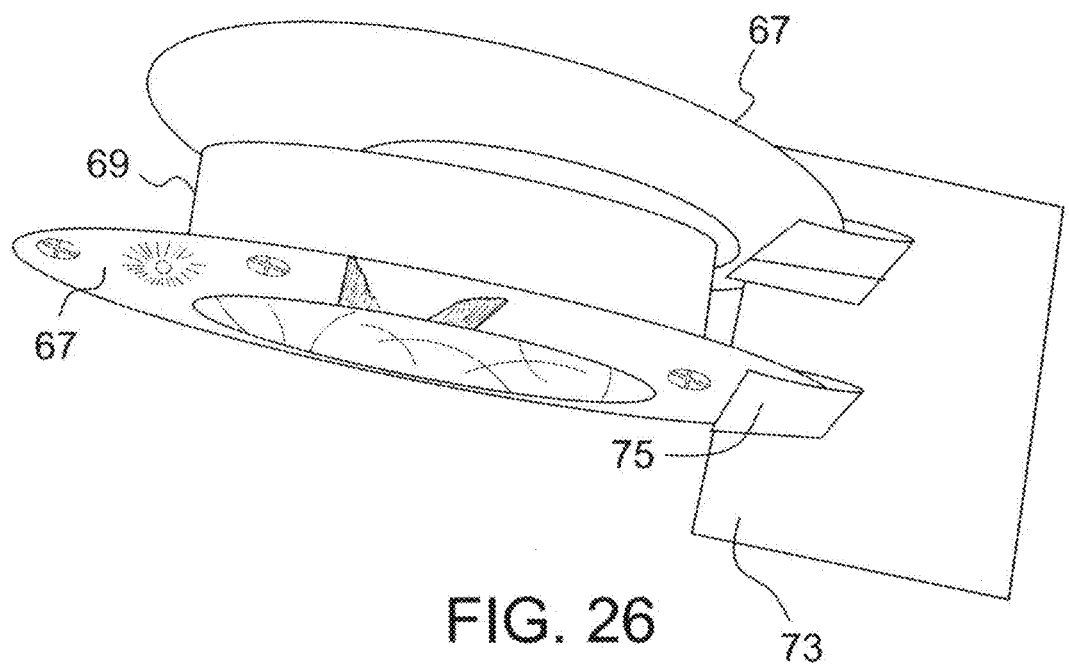

Black glossy cardboard brings out the prismatic colors created by light refraction and reflection in the cut-outs of cellophane when viewed with polarized light. Light diffraction and interference also play a role, but the most prominent activity is in the reflection and refraction of light. This effect on the cellophane and tape art with the sky acting as a polarizer and using one polarizing film in front is shown in FIGS. 25-26. The tape art and regular folded cellophane also work with the back glossy cardboard. In some embodiments, the black glossy cardboard is in a shape such that it forms a part of the art work, for example it may be an animal shape, an ambiguous shape, or any of a variety of shapes to enhance the cellophane art placed on it. The shapes may be three-dimensional. The shape of the black cardboard may combine with the cellophane art to form a unified overall object, for example the cardboard could be in the rough shape of a baseball glove and the cellophane in the rough shape of a baseball ball in the glove, or the cardboard could form the outer petals of a flower and the cellophane art could make up the inner parts of the flower.

In some embodiments, folded structures of black glossy cardboard are created to alter the angles of incident light passing through flat or three dimensional structures of cellophane art. These reflective surfaces need not be black and in some embodiments are made of other material besides cardboard.

Figure 18:
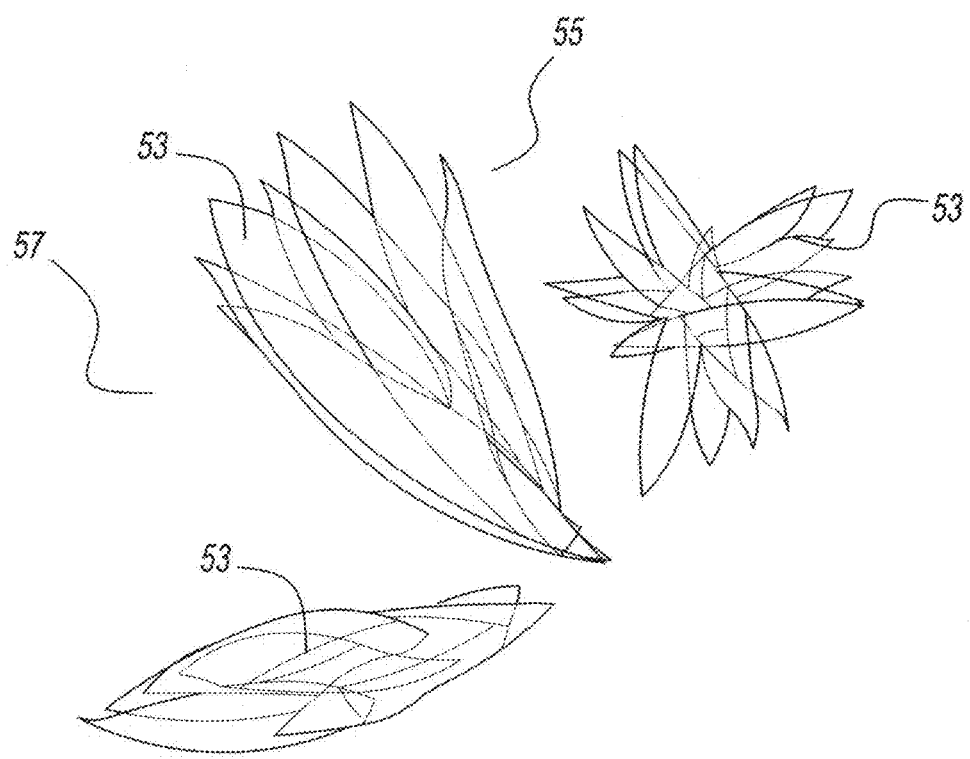
FIGS. 18-19 show cellophane cut-outs and origami viewed against a blue sky through a polarizing film.
Figure 19:
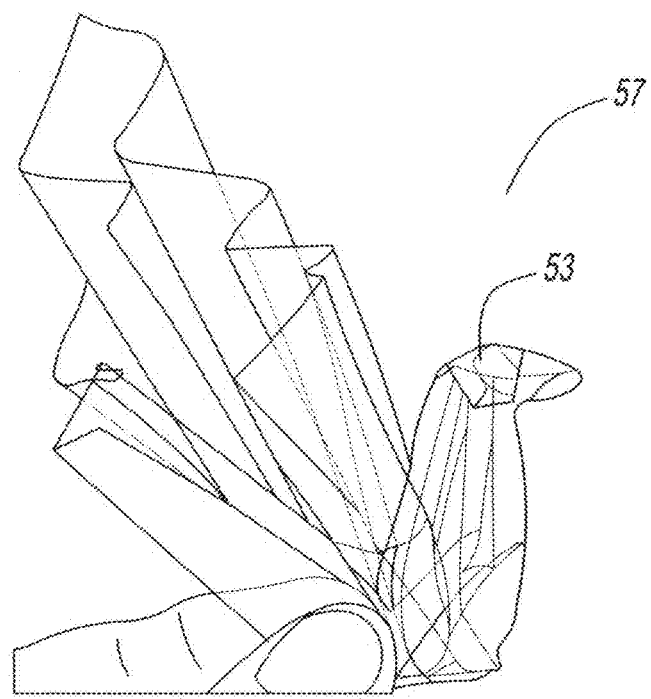

FIGS. 18-19 show cellophane cut-outs and origami viewed against a blue sky through a polarizing film. Holding a cellophane toy up to the blue sky instead of a second polarizing film works very well to bring out dynamic, colorful patterns. The cellophane art, whether cut shapes and/or origami, with or without tape art, in one embodiment is constructed into a kite and flown like a kite, or in other embodiments, made to fly electronically or by other means. In some embodiments, polarizing film is a part of the assembly and allows the colorful patterns to be viewed without any device carried by the viewer on the ground. In other embodiments, the kite is viewed through a polarizing film, such as with polarizing glasses, using the blue sky as the other polarizing source. Materials other than cellophane and tape are used in the construction of the kite in some embodiments, including photoelastic plastic material.

Figure 20:
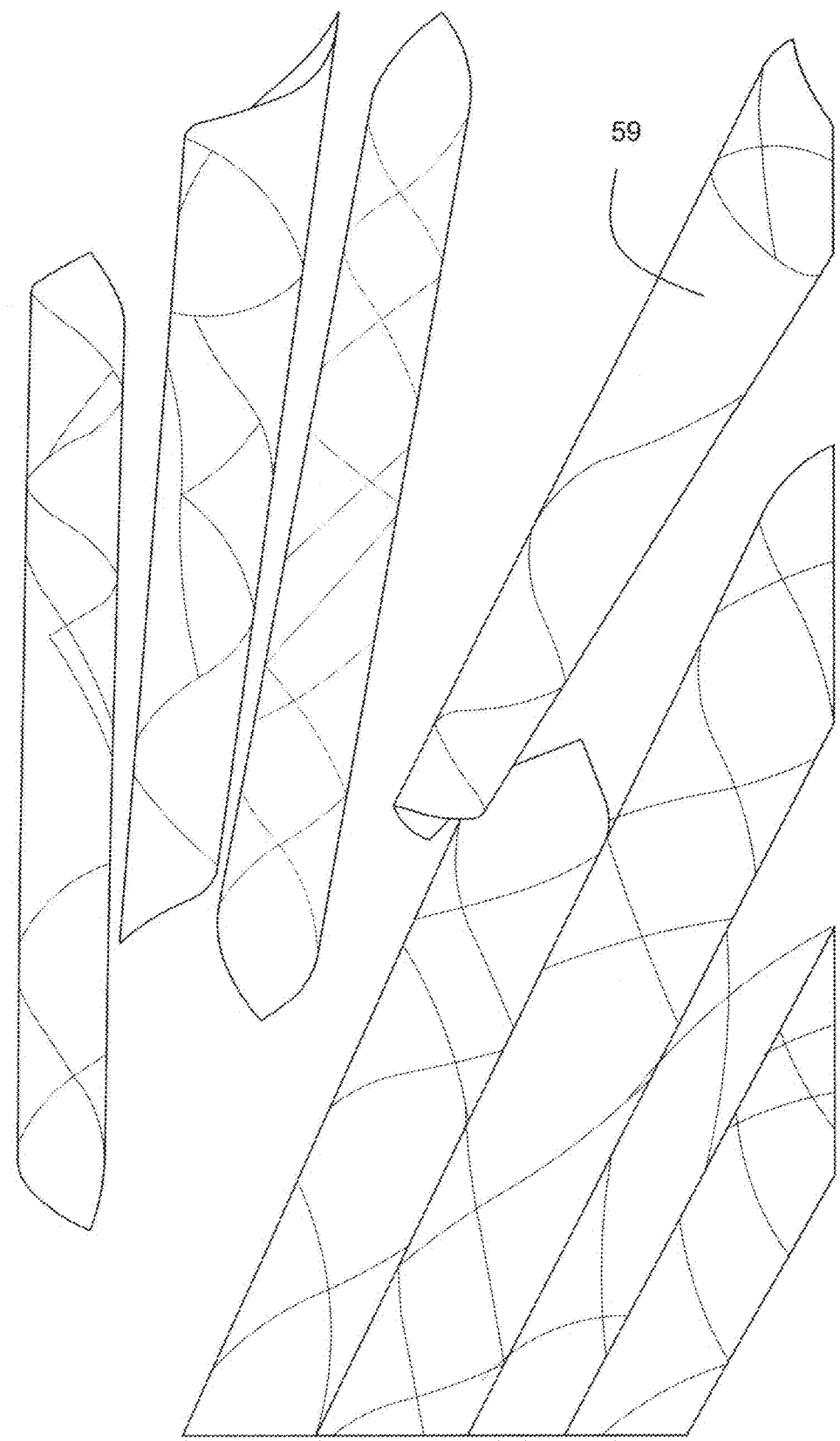
FIG. 20 shows cellophane tubes.

FIG. 20 shows cellophane tubes. Cellophane sheets are rolled into tubes, causing the cellophane to overlap itself. The various levels of overlap and curvature create shifting color patterns under polarized light. The cellophane sheets can be folded and/or cut prior to rolling for even more variance in color patterns.

Figure 21:
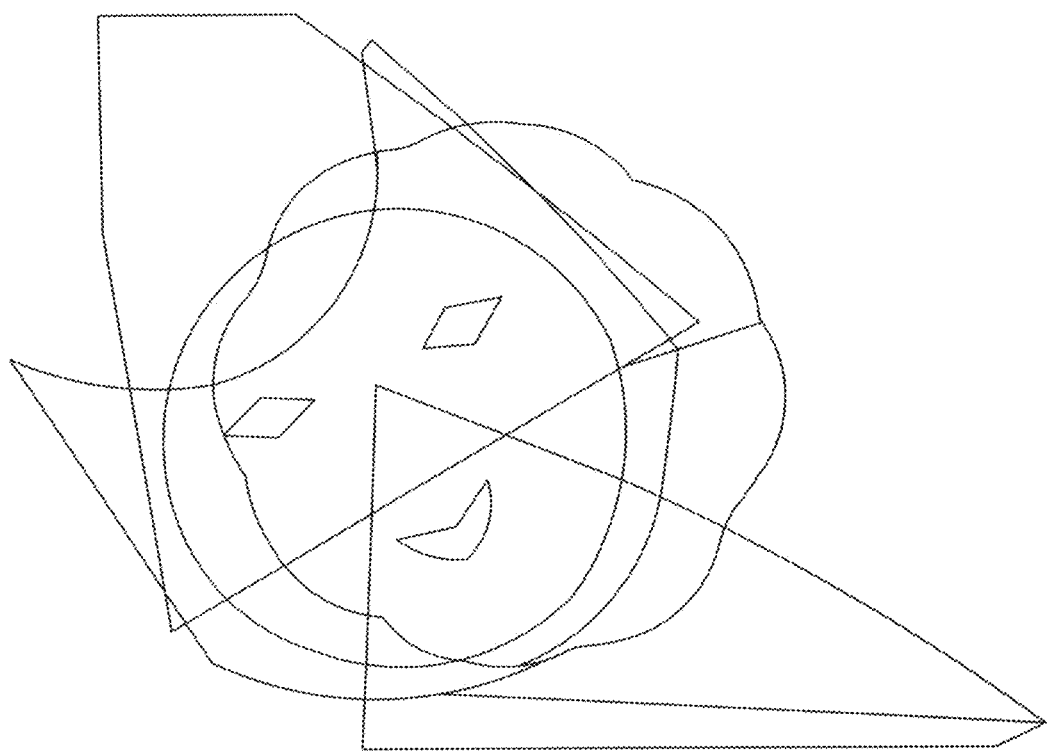
FIGS. 21-22 show examples of cellophane cut-out optical art.
Figure 22:
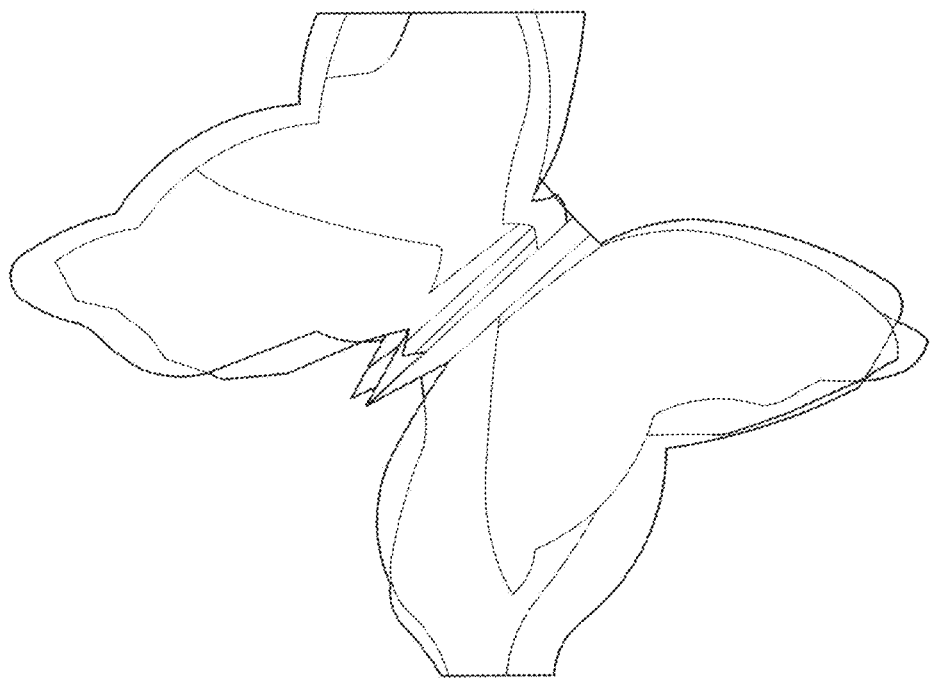

FIGS. 21-22 show examples of cellophane cut-out optical art. FIG. 21 is a human figure and FIG. 22 is a butterfly with vivid colors. By careful cutting and overlapping of cellophane, a wide variety of designs and color schemes can be achieved. In FIG. 21, the layering of the cellophane sheets creates eyes and a mouth of similar colors, distinct from the surrounding color of the rest of the face. Any number of complex designs can be created in such a fashion.

Figure 23:
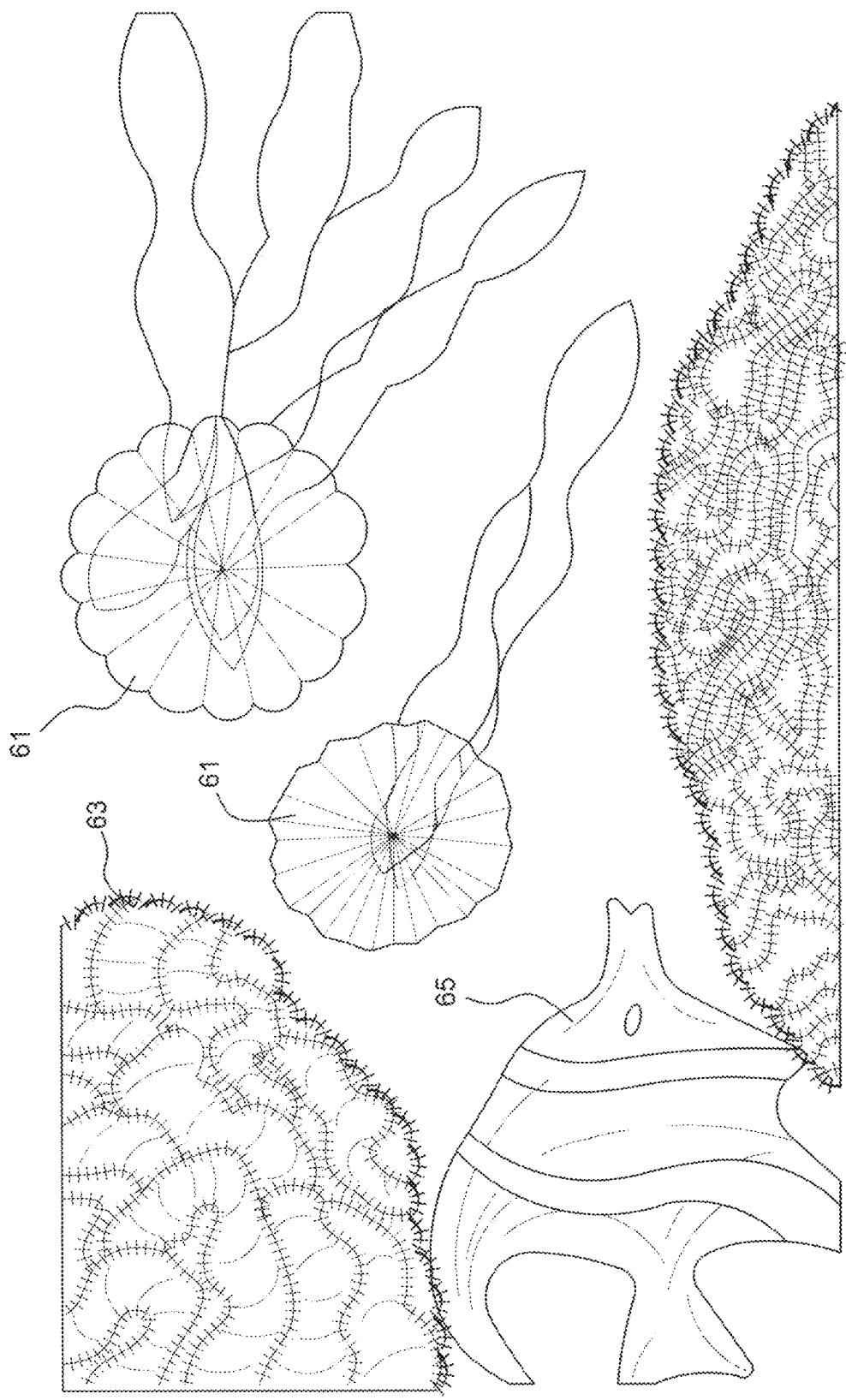
FIG. 23 shows an example of a diorama using a fish-tank polariscope enclosure.

FIG. 23 shows an example of a diorama using a fish-tank polariscope container. The polariscope container has polarizing material on its sides and cellophane designs 61 are inserted in the container along with, for example, coral 63, and photoelastic plastic objects 65 to create a vivid underwater scene.

Figure 24:
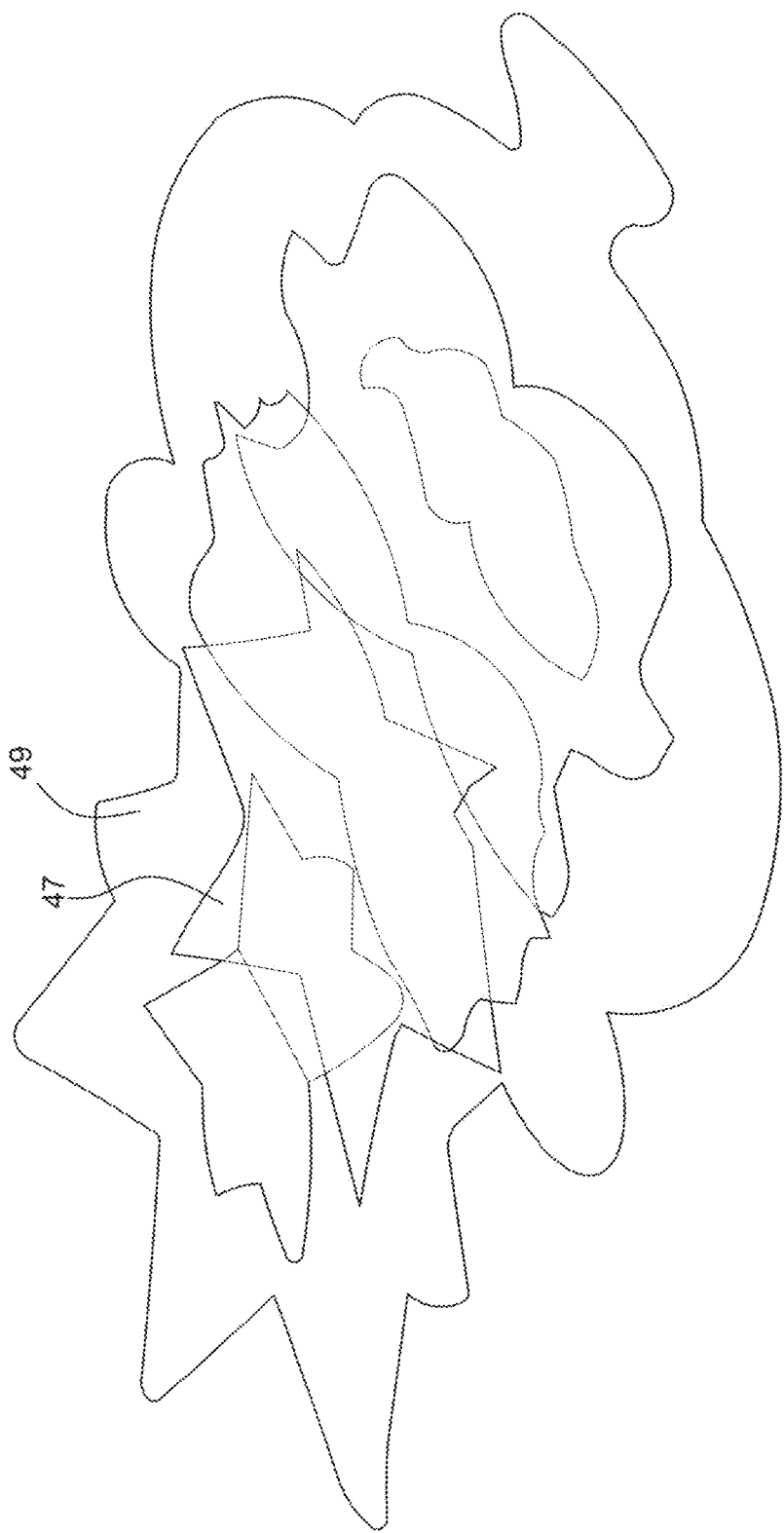
FIG. 24 shows an example of layered cut-out cellophane viewed on glossy black cardboard.

FIG. 24 shows an example of layered cut-out cellophane 47 viewed on glossy black cardboard 49. If the cellophane is rotated over the cardboard, the colors shift. This same effect is achieved when rotating the cellophane in front of the sky or a polarizing reflective surface like water.

Figure 27:
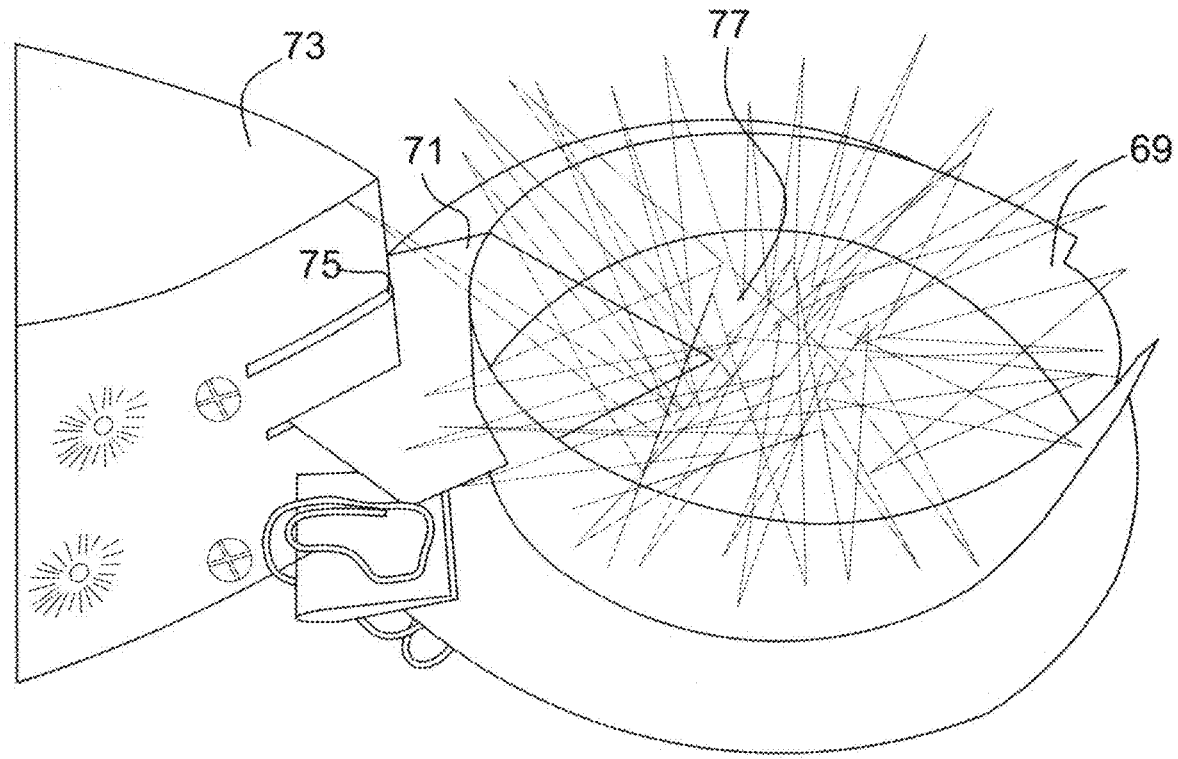
Figure 28:
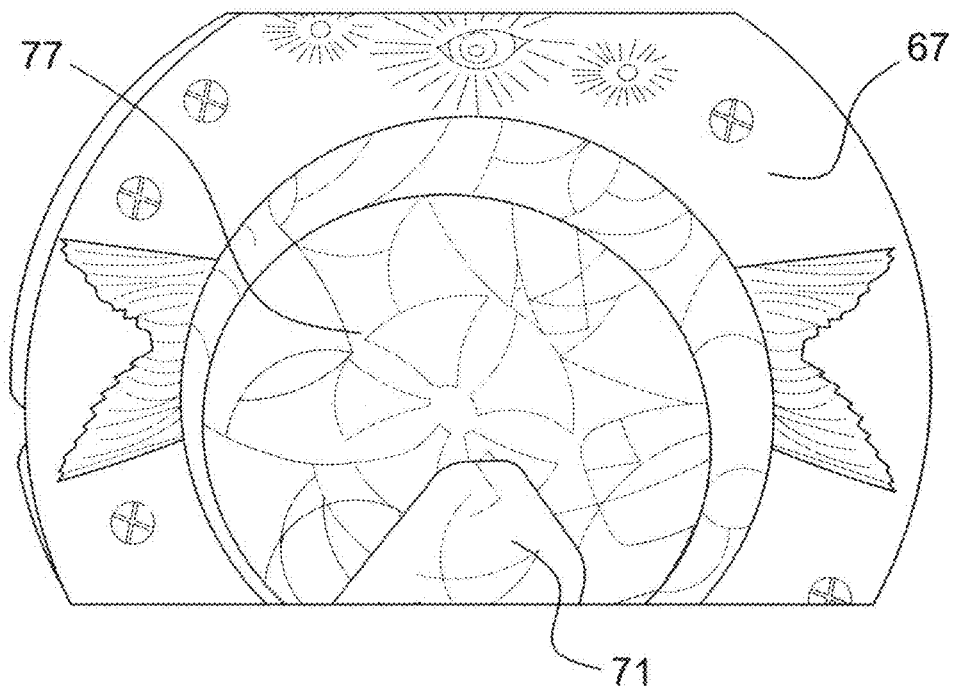
Figure 29:
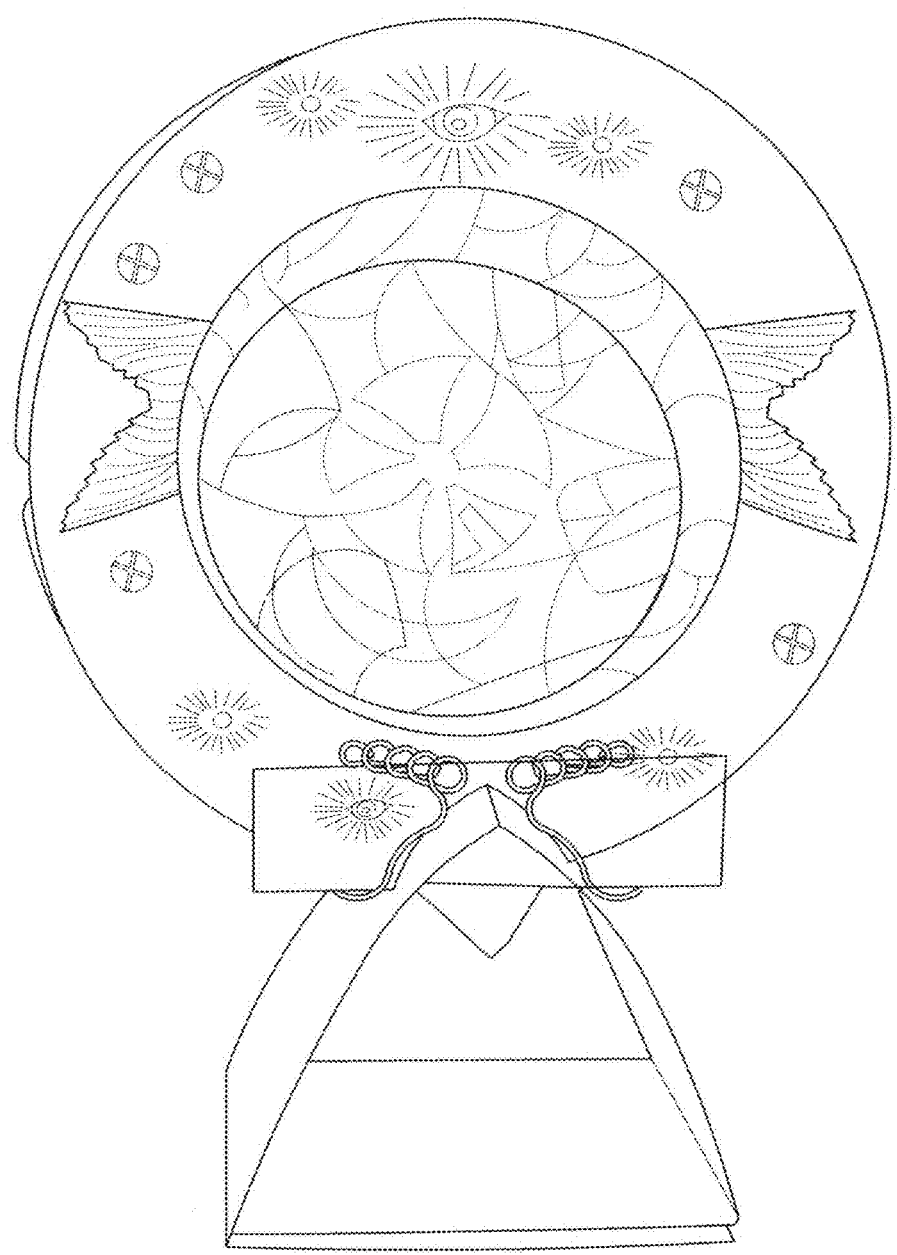

FIGS. 25-29 show the steps of inserting cellophane art into a polariscope for viewing. FIG. 25 shows a polarizing film mounted on a ring 67 inserted into a side slot 75 in stand 73. Black glossy cardboard diamond 71 is inserted in another slot 75 and secures a cylindrical strip of cardboard 69. The stand 73 as shown is created by folding a paper strip and inserting a tab in the strip into a slot in the strip. In FIG. 26, a second ring 67 is inserted in another slot 75 in the stand 73, such that the rings 67 sandwich the cardboard cylinder 69. FIG. 27 shows overlapping cellophane 77 inserted in the cardboard cylinder 69. When the second ring 67 is added, the cellophane 77 is secured between the two rings (and polarizing films). FIGS. 28 and 29 show the cellophane 77 inserted between the rings 67 viewed under light polarized by the films.

Figure 30:
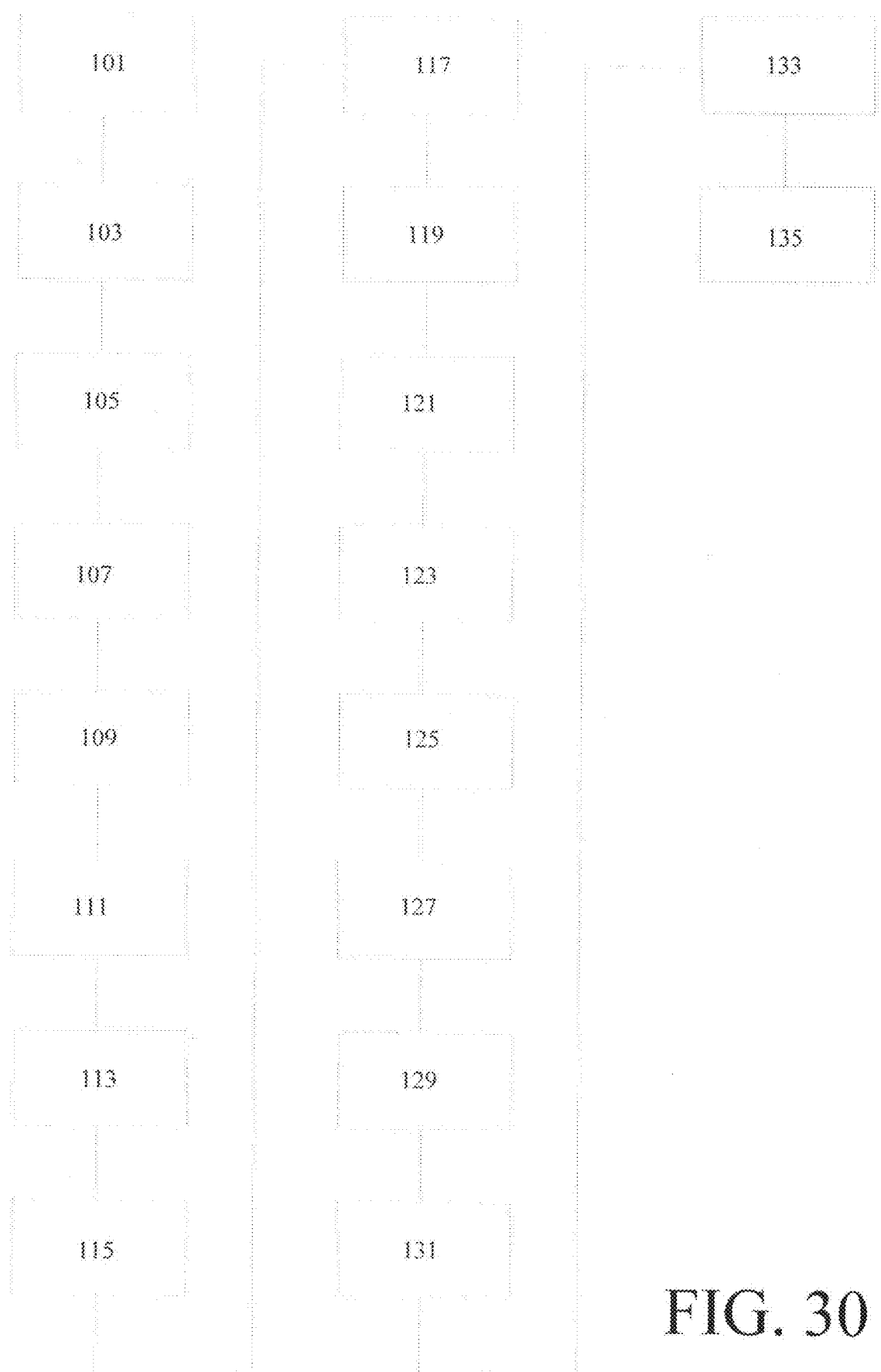
FIG. 30 is a flowchart illustrating an embodiment of an optical art method.
Figure 31:
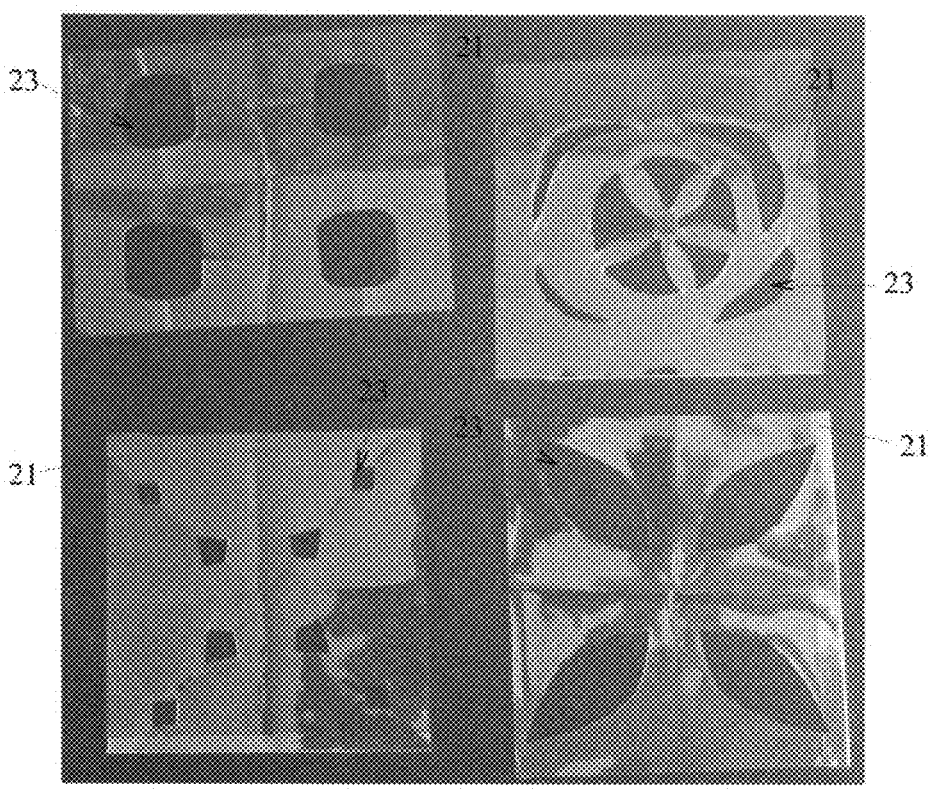
FIGS. 31-46 are color photographs of FIGS. 4-6, 11-14, 17-24 and 28, respectively.
Figure 32:
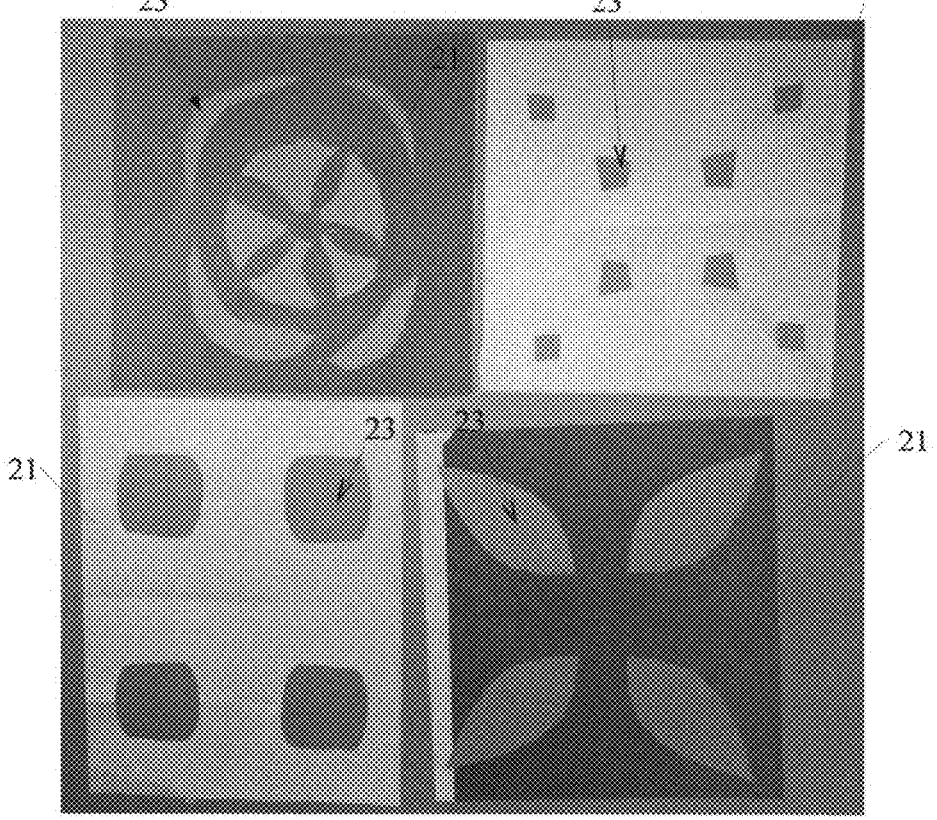
Figure 33:
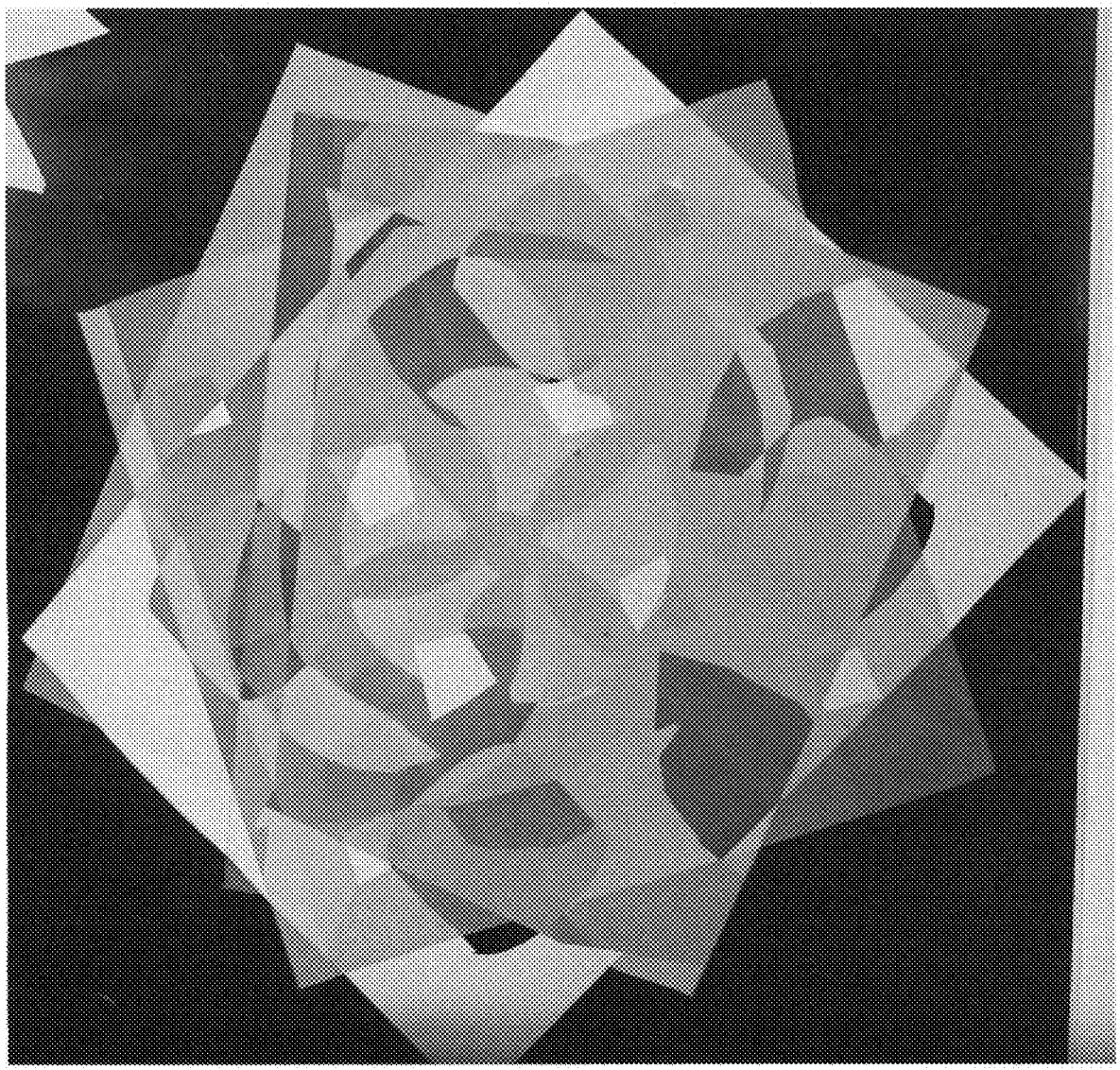
Figure 34:
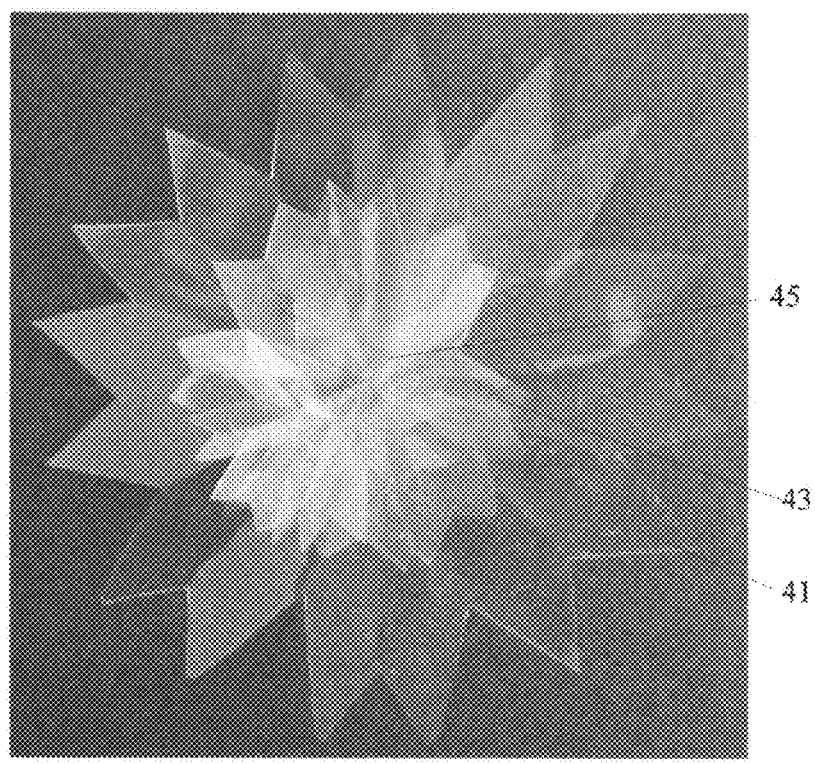
Figure 35:
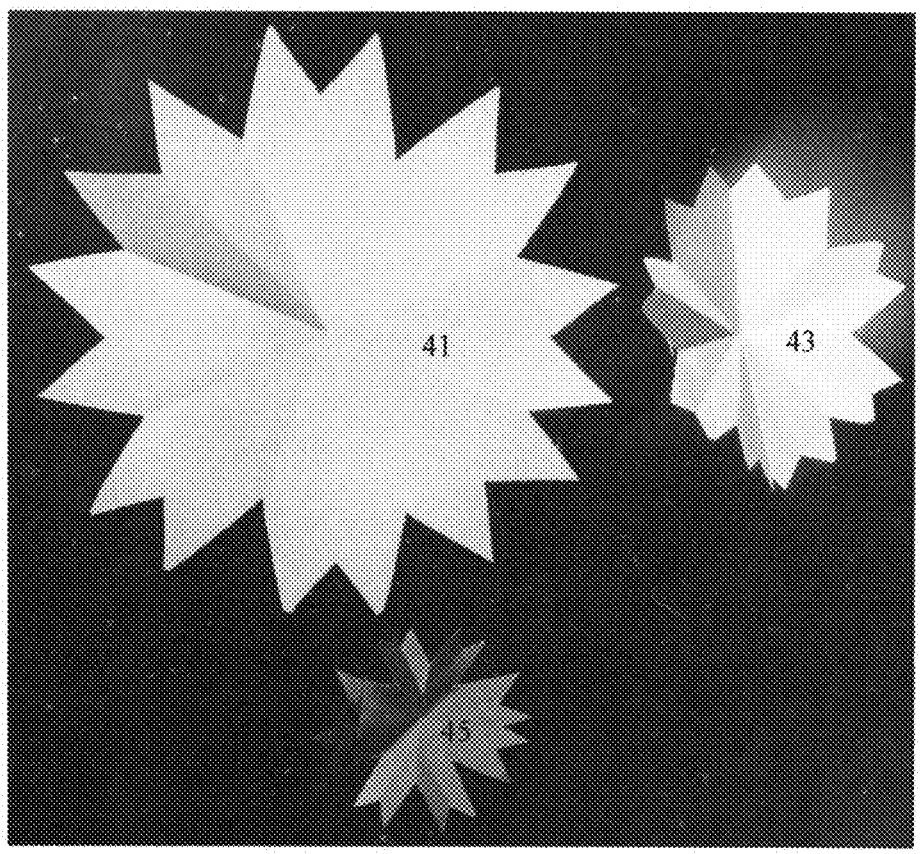
Figure 36:
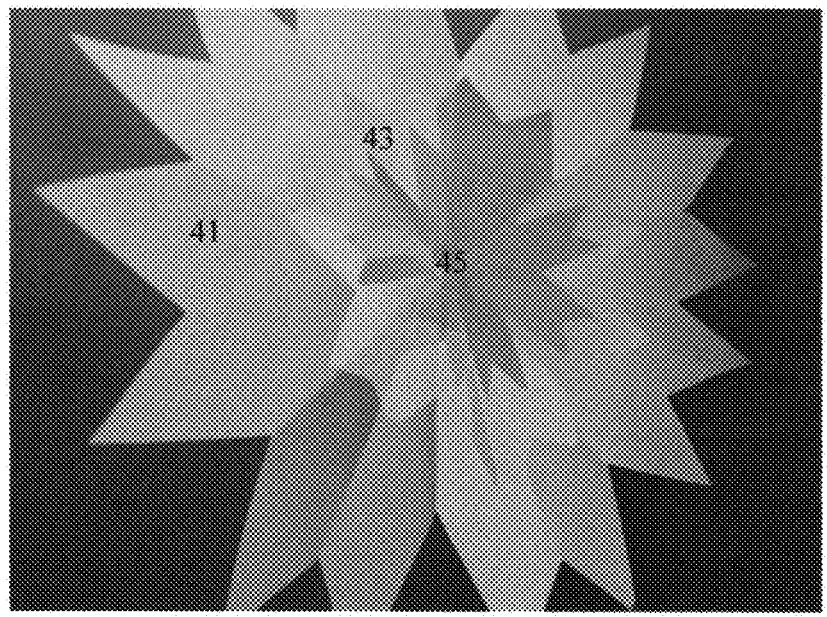
Figure 37:
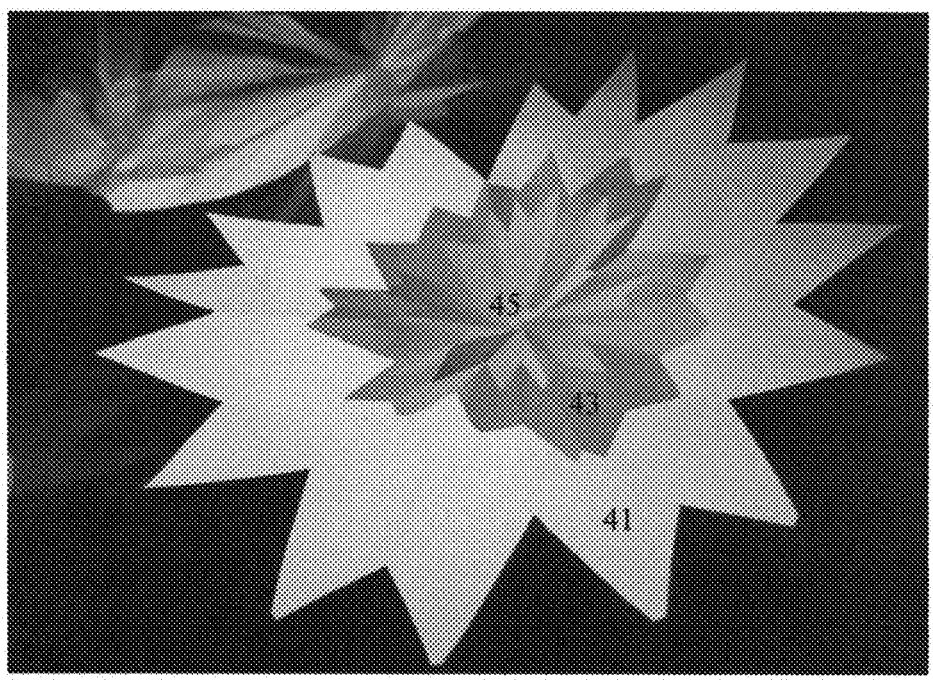
Figure 38:
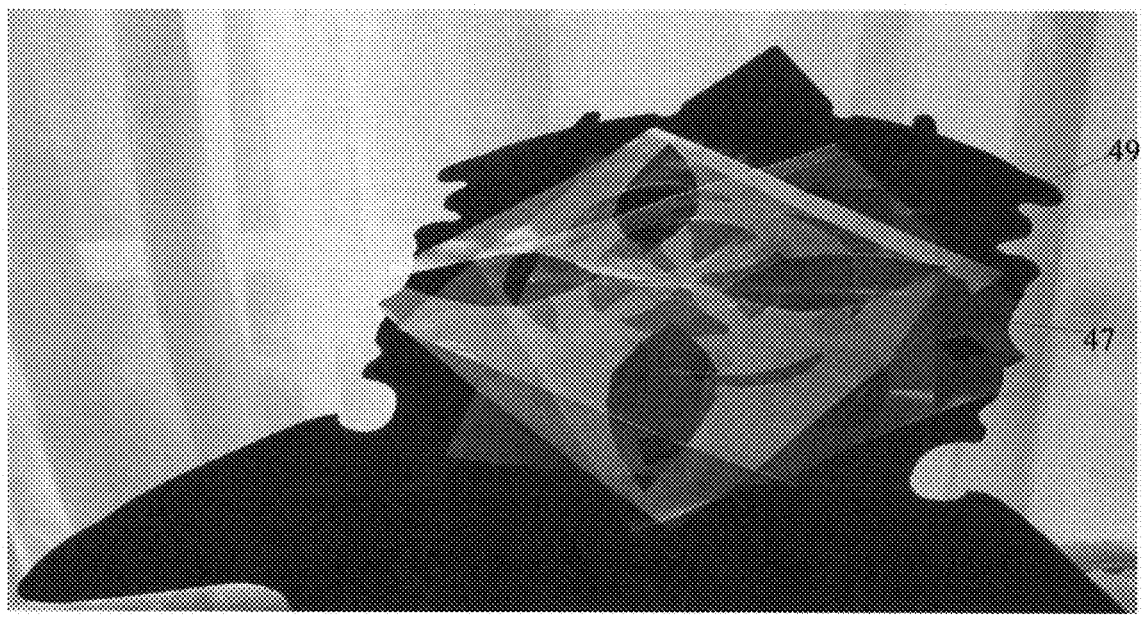
Figure 39:
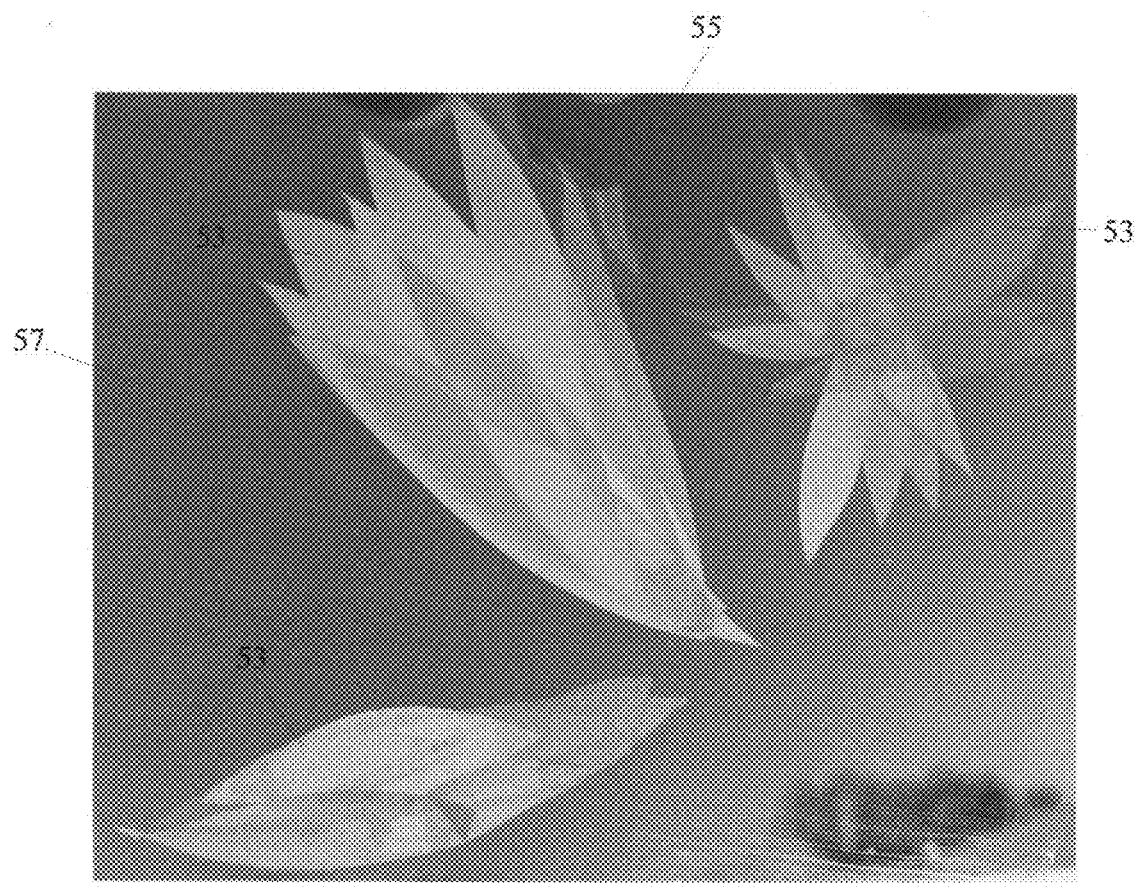
Figure 40:
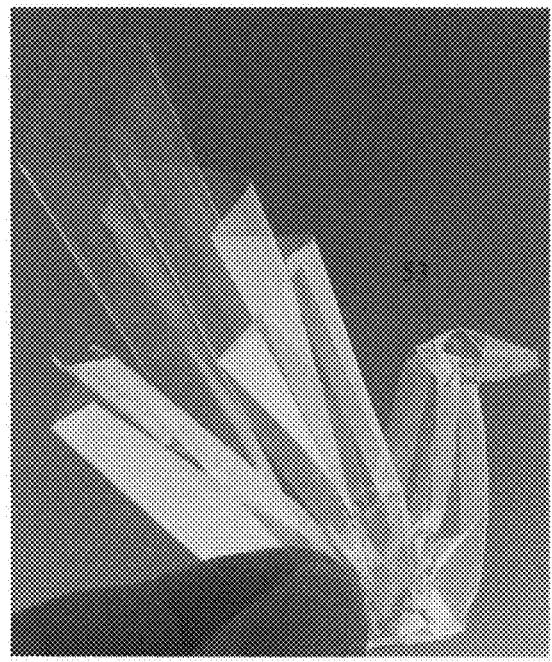
Figure 41:
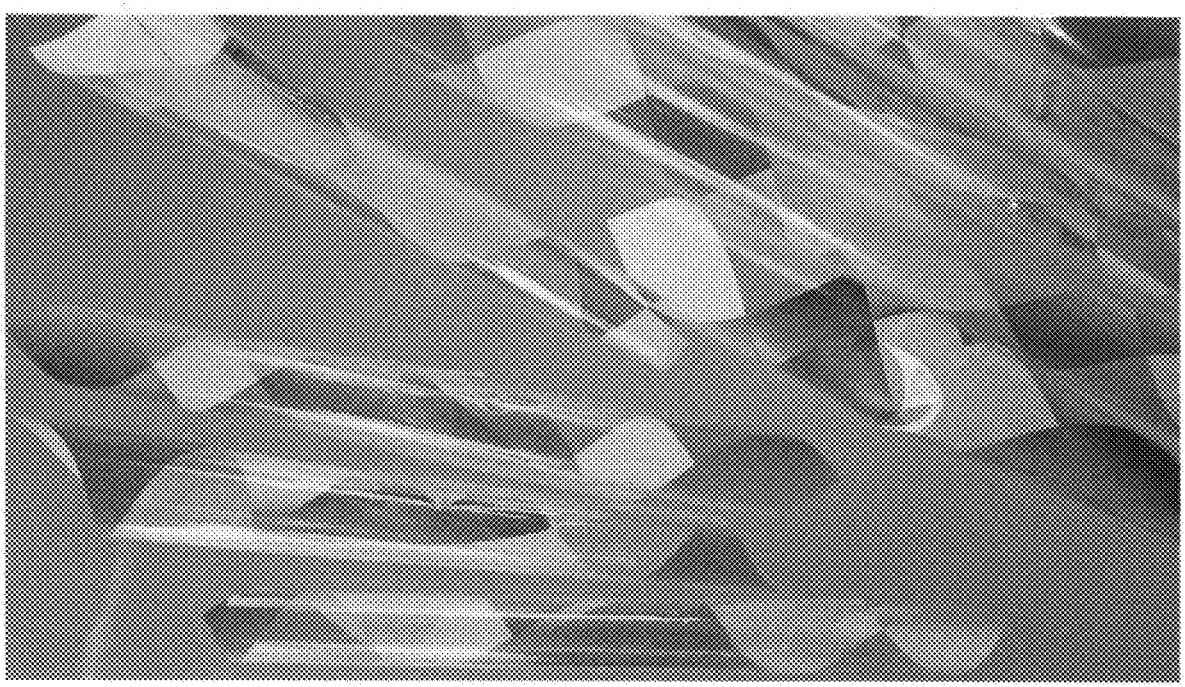
Figure 42:
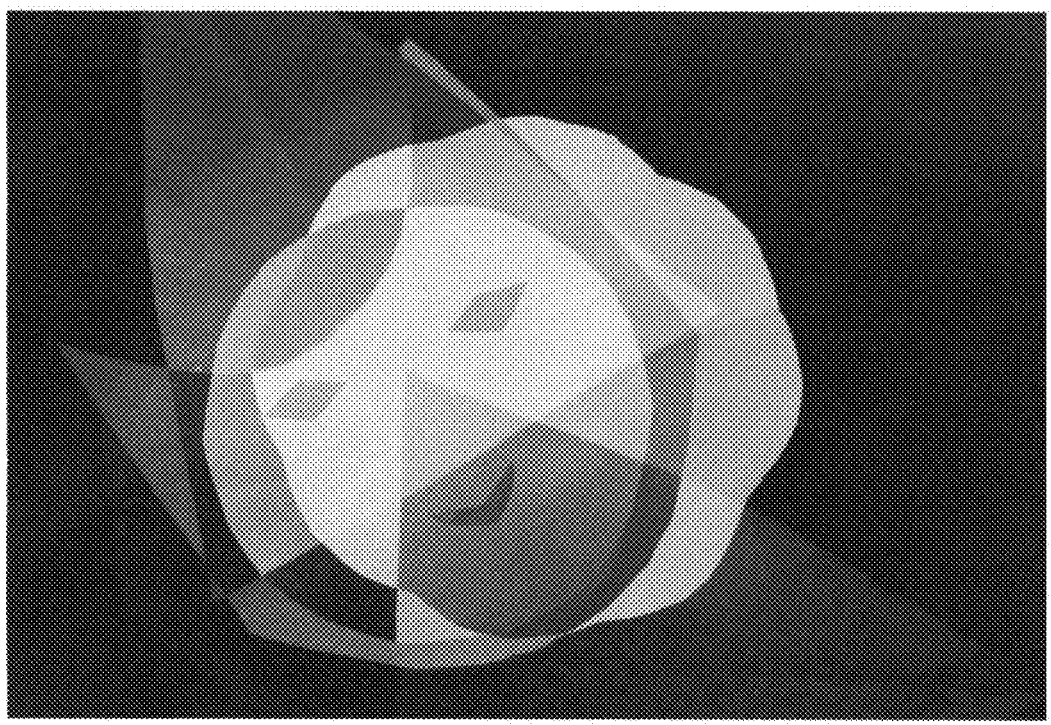
Figure 43:
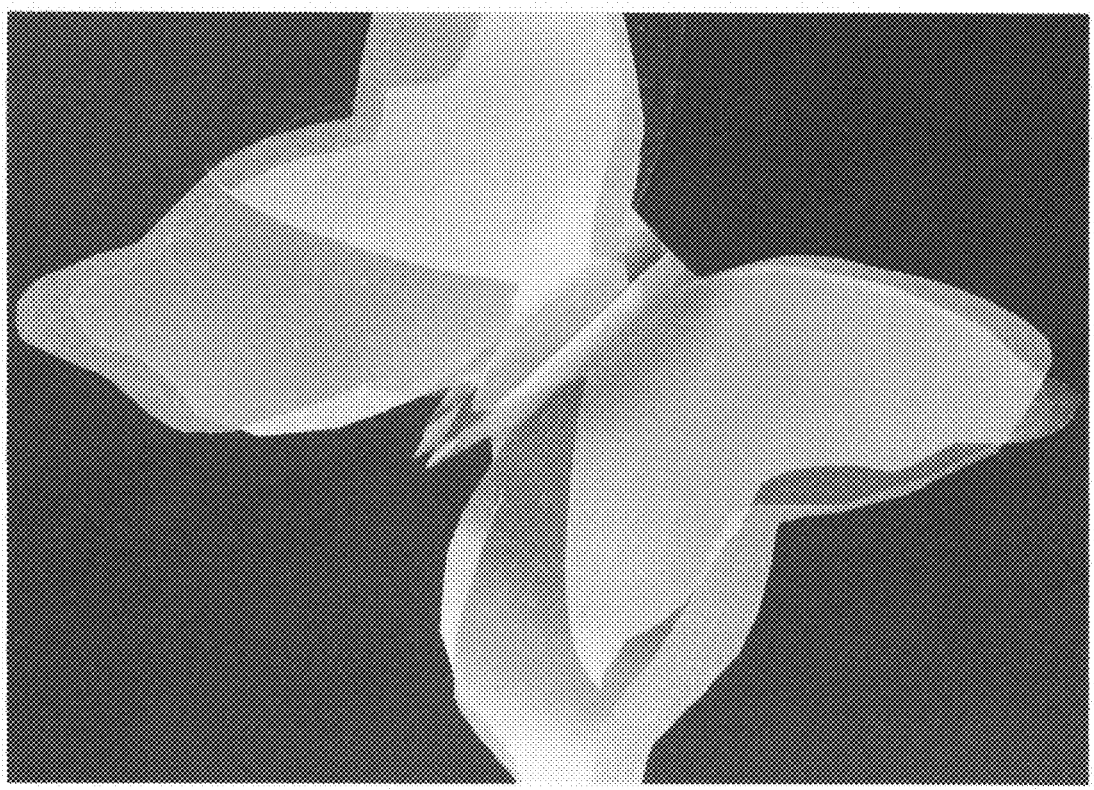
Figure 44:
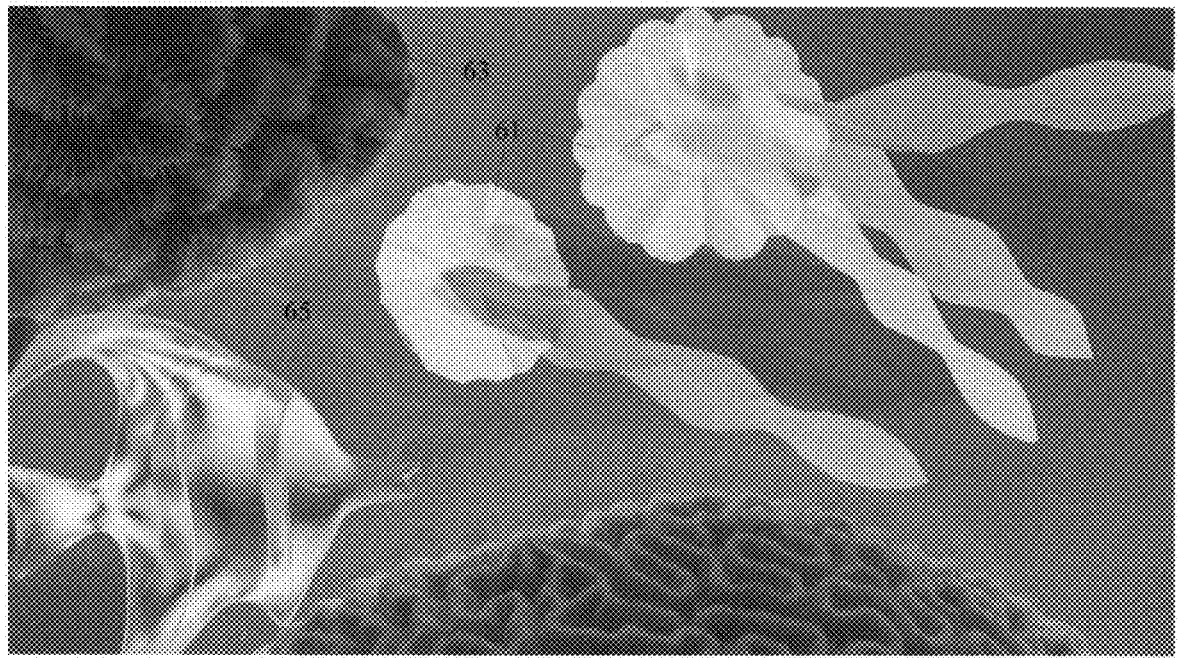
Figure 45:
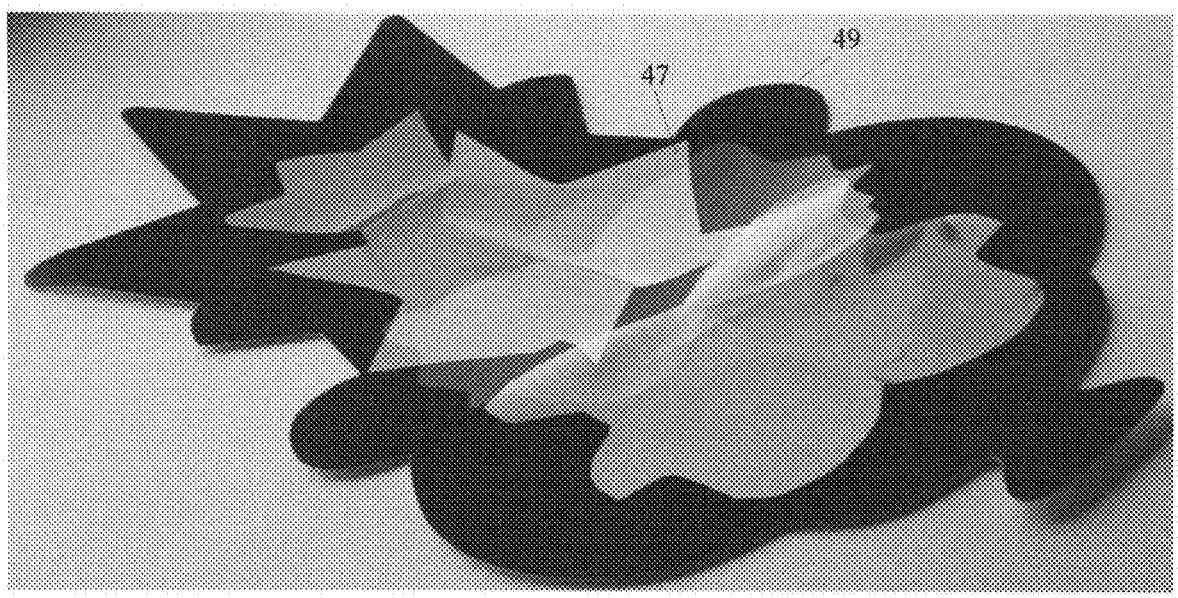
Figure 46:

FIG. 30 is a flowchart illustrating an embodiment of an optical art method. One or more sheets of cellophane or translucent paper-thin material layered with liquid optical material are folded 101, one or more shapes are cut out 103 along a fold of the one or more folded sheets of cellophane, the sheet is unfolded 105 to reveal one or more symmetrical designs, and the designs are viewed 107 under polarized light. Two or more of the designs are overlapped 109 when viewing the designs under polarized light to create diffraction patterns. One or more of the sheets are folded 111 into a three-dimensional design. The three-dimensional design may be stacked 113 with another design and this other design may also be three-dimensional.

A source of the polarized light 115 and/or the designs 117 are moved or rotated to produce shifting colors. The designs are viewed with a polariscope 119 and/or a polarizing lens 121. The polarizing lens may be rotated 123 during viewing to produce shifting colors. The designs are placed 125 on glossy black cardboard. The designs are viewed under polarizing light by holding them 127 up to a blue sky. A kite including the designs is constructed 129. The cellophane is sandwiched 131 between polarizing films and the polarizing films are secured together at their edges with one or more rings of cardboard. One or more of the cut-out shapes are fixed 133 to the unfolded sheet. Glow-in-the-dark material is added 135 to the unfolded cellophane.

FIGS. 31-46 are color photographs of FIGS. 4-6, 11-14, 17-24 and 29, respectively.

In some embodiments, the polariscope takes a variety of forms. In one such embodiment, the polariscope comprises a container in which the cellophane art cut-outs are placed. Other objects can also be placed inside to create an art scene or diorama, for example rocks, coral, and other photoelastic plastic items may be placed inside to create a fish tank scene. The container may have polarizing material on its sides for viewing the contents under polarized light.

Cellophane squares or other shapes and directions are supplied for the purpose of cutting out intricate patterns as is done with paper doll or snowflake cutouts. These patterns are overlapped for endless optical effects. In some embodiments, pre-cut patterns are overlapped in a variety of ways. The folded cellophane and even the cut outs in some embodiments make 3D objects that can be enjoyed and not just flat art objects.

Cellophane images are colorful when viewed under polarized light, otherwise the images just look like a clear piece of cellophane. This effect has not previously been used in this manner for a toy product. Kits provide directions for creating patterns by folding the cellophane and cutting out holes. One or more of these patterns are overlapped with each other and viewed with the toy polariscope to provide an endless experience of changing colors. Some patterns can stand up and create a 3D effect.

Cut-outs can be displayed sandwiched between two rings with polarizing films in both the vertical and horizontal position and can be simply clipped or laid over one ring and viewed with polarizing glasses. The use of glasses and one ring is more effective when using the 3D creations of folded cellophane or folded and stacked cellophane.

The invention is not limited to the particular embodiments described above in detail. Those skilled in the art will recognize that other arrangements could be devised, for example, using various shapes and sizes of cellophane sheets, variously shaped and sized cut-outs, various tools and methods of creating cut-outs, various devices and structures for viewing, and various methods of layering and interacting multiple sheets to create various patterns of light. The invention encompasses every possible combination of the various features of each embodiment disclosed. While the invention has been described with reference to specific illustrative embodiments, modifications and variations of the invention may be constructed without departing from the scope of the invention.

I claim:

1. A method of physically moving and manipulating optical art, comprising:
    folding one or more sheets of cellophane;
    cutting one or more shapes out along a fold of the one or more folded sheets of cellophane;
    unfolding the cellophane to reveal one or more symmetrical designs;
    orienting the one or more symmetrical designs in the vicinity of a polarized light; and
    passing the polarized light through the one or more symmetrical designs to a human eye.

2. The method of claim 1, further comprising overlapping two or more of the designs and creating diffraction patterns.

3. The method of claim 1, further comprising folding one or more of the sheets of cellophane into a three-dimensional design.

4. The method of claim 3, further comprising stacking the three-dimensional design with another design.

5. The method of claim 4, wherein the other design is also three-dimensional.

6. The method of claim 1, further comprising moving or rotating a source of the polarized light.

7. The method of claim 1, further comprising moving or rotating the designs during said step of passing the polarized light through the one or more symmetrical designs to a human eye.

8. The method of claim 1, wherein passing the polarized light through the one or more symmetrical designs to a human eye further comprises passing the polarized light through a polariscope.

9. The method of claim 8, wherein the polariscope is a container and further comprising placing the designs in the container along with other photoelastic and decorative objects, and thereby forming a diorama.

10. The method of claim 1, wherein passing the polarized light through the one or more symmetrical designs to a human eye further comprises passing the polarized light through a polarizing lens.

11. The method of claim 10, further comprising rotating the polarizing lens.

12. The method of claim 1, further comprising placing the designs on glossy black cardboard.

13. The method of claim 12, further comprising cutting the glossy black cardboard into a shape, placing the designs on the glossy black cardboard shape to combine the designs and the glossy black cardboard shape and thereby forming a unified object.

14. The method of claim 1, wherein orienting the one or more symmetrical designs in the vicinity of the polarized light comprises holding the one or more symmetrical designs up to a blue sky; and wherein passing the polarized light through the one or more symmetrical designs to a human eye further comprises passing the polarized light from the blue sky through the one or more symmetrical designs to a human eye.

15. The method of claim 1, further comprising constructing a kite comprising the designs.

16. The method of claim 1, wherein the folding one or more sheets of cellophane comprises folding two or more sheets of cellophane identically, wherein the cutting one or more shapes out along a fold of the one or more folded sheets of cellophane comprises cutting similar shapes out of each sheet of cellophane, but in different sizes, further comprising aligning and layering the cellophane sheets in order from the cellophane sheet with the smallest cut-out shapes to the sheet with the largest cut-out shapes, such that the cut-out shapes of each cellophane sheet surround the cut-out shapes of the cellophane sheet beneath it.

17. The method of claim 1, further comprising sandwiching the cellophane between polarizing films and securing the polarizing films together at their edges with one or more rings of cardboard.

18. The method of claim 1, further comprising fixing one or more of the cut-out shapes to unfolded cellophane.

19. The method of claim 1, further comprising adding glow-in-the-dark material to the unfolded cellophane.

20. A method of physically moving and manipulating optical art, comprising:
    folding one or more sheets of translucent paper-thin material;
    layering the one or more sheets of translucent paper-thin material with liquid optical material;
    cutting one or more shapes out along a fold of the one or more folded sheets of translucent paper-thin material;
    unfolding the translucent paper-thin material to reveal one or more symmetrical designs;
    orienting the one or more symmetrical shapes in the vicinity of polarized light; and
    passing the polarized light through the designs to a human eye.

21. The method of claim 20, wherein:
    the one or more sheets of translucent paper-thin material are cellophane.

22. The method of claim 20, wherein:
    the liquid optical material is rubber cement.

* * * * *